US010710654B2

(12) United States Patent
Beiler

(10) Patent No.: US 10,710,654 B2
(45) Date of Patent: Jul. 14, 2020

(54) HYDRAULIC DRIVE SYSTEM

(71) Applicant: New Heights, LLC, Leola, PA (US)

(72) Inventor: Aaron Jay Beiler, Gap, PA (US)

(73) Assignee: New Heights, LLC, Leola, PA (US)

(*) Notice: Subject to any disclaimer, the term of this patent is extended or adjusted under 35 U.S.C. 154(b) by 0 days.

(21) Appl. No.: 15/402,674

(22) Filed: Jan. 10, 2017

(65) Prior Publication Data
US 2018/0194410 A1  Jul. 12, 2018

(51) Int. Cl.
B62D 59/04 (2006.01)
B60K 7/00 (2006.01)
F16D 11/14 (2006.01)
B60K 8/00 (2006.01)
B60K 17/04 (2006.01)
F16D 23/12 (2006.01)

(52) U.S. Cl.
CPC ............ B62D 59/04 (2013.01); B60K 7/0015 (2013.01); B60K 8/00 (2013.01); B60K 17/046 (2013.01); F16D 11/14 (2013.01); B60K 2007/0038 (2013.01); B60K 2007/0092 (2013.01); B60Y 2200/147 (2013.01); B60Y 2400/421 (2013.01); B60Y 2400/73 (2013.01); B60Y 2410/10 (2013.01); F16D 2023/126 (2013.01)

(58) Field of Classification Search
CPC .... B60K 17/356; B60K 7/0015; B60K 23/08; B60K 2023/0883; B60K 2023/0891; B62D 59/04
See application file for complete search history.

(56) References Cited

U.S. PATENT DOCUMENTS

| 4,185,713 | A | * | 1/1980 | Williams | B60K 17/10 180/242 |
| 4,588,322 | A | * | 5/1986 | Shoemaker | F16D 1/092 192/95 |
| 5,261,801 | A | * | 11/1993 | Stone | F16D 11/14 192/96 |
| 6,312,238 | B1 | * | 11/2001 | Gerlach | F03C 1/0403 192/85.5 |
| 8,292,776 | B1 | * | 10/2012 | Higman | B60K 7/0015 180/372 |
| 8,795,130 | B2 | * | 8/2014 | Forrest | F16D 11/14 192/69.43 |

(Continued)

FOREIGN PATENT DOCUMENTS

EP  3381773 A1 * 10/2018 ............ B62D 59/04
FR  1309984 A  3/1963

(Continued)

OTHER PUBLICATIONS

Extended European Search Report, European Patent Application No. 18150656.9, dated Oct. 5, 2018, 11 pages.
Abstract of FR 2409162 A1, dated Jun. 15, 1979, 1 page.

Primary Examiner — Katy M Ebner
(74) Attorney, Agent, or Firm — Barley Snyder

(57) ABSTRACT

A hydraulic drive system is disclosed. The hydraulic drive system includes a body housing, a rotor assembly, a motor assembly, and an engagement assembly. The first rotor assembly is attached to a first side of the body housing, while the first motor assembly is disposed inside the body housing and includes a first motor actuator. The engagement assembly positions the first motor actuator to engage and disengage with the first rotor assembly.

37 Claims, 32 Drawing Sheets

(56) References Cited

U.S. PATENT DOCUMENTS

| | | | |
|---|---|---|---|
| 9,010,876 B2* | 4/2015 | Stelter | B60B 23/00 180/247 |
| 2002/0070065 A1* | 6/2002 | Bracke | B60K 17/02 180/242 |
| 2002/0112934 A1* | 8/2002 | Karambelas | B60K 17/3515 192/69.43 |
| 2002/0125060 A1* | 9/2002 | Cigal | B60K 7/0015 180/305 |
| 2004/0200648 A1 | 10/2004 | Tarasinski et al. | |
| 2007/0163253 A1* | 7/2007 | Sakakura | B60K 17/10 60/487 |
| 2009/0197730 A1* | 8/2009 | Berhan | B60K 6/365 475/150 |
| 2011/0197575 A1* | 8/2011 | Prigent | F04C 11/003 60/413 |
| 2012/0187747 A1* | 7/2012 | Dagh | B60K 7/0015 301/6.5 |
| 2012/0240724 A1* | 9/2012 | Welschof | B60K 17/356 74/730.1 |
| 2013/0160436 A1 | 6/2013 | Scheibel | |
| 2015/0096822 A1* | 4/2015 | Sato | F16H 48/30 180/250 |
| 2015/0283892 A1* | 10/2015 | Larsson | B60K 6/12 180/243 |

FOREIGN PATENT DOCUMENTS

| | | | |
|---|---|---|---|
| FR | 2409162 A1 * | 6/1979 | B60K 7/0015 |
| FR | 2409162 A1 | 6/1979 | |

* cited by examiner

HYDRAULIC DRIVE SYSTEM

FIELD OF THE INVENTION

The present invention relates to a hydraulic drive system, and more particularly, to a hydraulic drive system powering drive wheels of a self-propelled trailer.

BACKGROUND

Hydraulic drive systems providing motive power in various applications, including providing power to drive wheels, are known in the art. In various applications, known hydraulic drive systems, used power drive wheels, have one or more hydraulic motors that continually connected and engaged with each drive wheel.

Many hydraulic drive system applications do not require the hydraulic motors to always provide the motive power, and consequently, the hydraulic motors are disengaged when not in use to prevent a resistance that slows the drive wheel and decreases the useful life of the hydraulic motor. However, known hydraulic drive systems are difficult to disengage and are disengaged manually. Known hydraulic drive systems thus decrease efficiency by not permitting simple engagement and disengagement, and by not optimally engaging and disengaging drive wheels depending on the required use of the hydraulic motors.

SUMMARY

An object of the invention, among others, is to provide a hydraulic drive system capable of engaging and disengaging drive wheels. Accordingly, a hydraulic drive system according to the invention is provided. The hydraulic drive system includes a body housing, a rotor assembly, a motor assembly, and an engagement assembly. The first rotor assembly is attached to a first side of the body housing, while the first motor assembly is disposed inside the body housing and includes a first motor actuator. The engagement assembly positions the first motor actuator to engage and disengage with the first rotor assembly.

BRIEF DESCRIPTION OF THE DRAWINGS

The invention will now be described by way of example with reference to the accompanying figures, of which.

DETAILED DESCRIPTION OF THE EMBODIMENT(S)

The invention is explained in greater detail below with reference to exemplary embodiments of a hydraulic drive system according to the invention. However, this invention may be embodied in many different forms and should not be construed as limited to the embodiments set forth herein; rather, these embodiments are provided so that this disclosure will be thorough and complete and still fully convey the scope of the invention to those skilled in the art.

Figure 1:
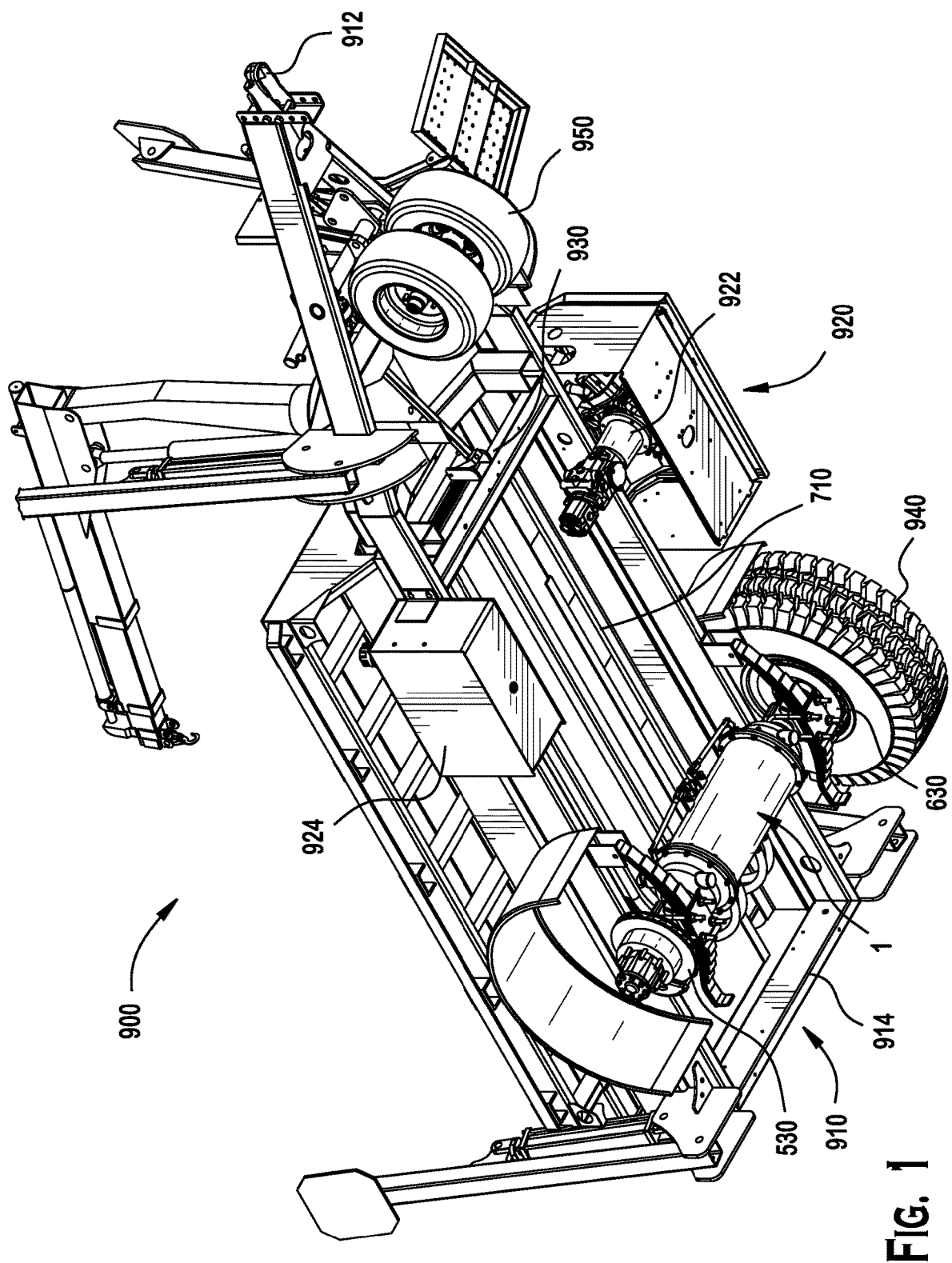
FIG. 1 is a perspective view of a trailer and a hydraulic drive system according to the invention.

With respect to FIG. 1, a hydraulic drive system 1 according to the invention is shown. In an exemplary embodiment of the invention, the hydraulic drive system 1 according to the invention is shown with a frame 910, a fluid supply system 920, an engagement mechanism 930, a pair of drive wheels 940, and a pair of steerable wheels 950.

Figure 2:
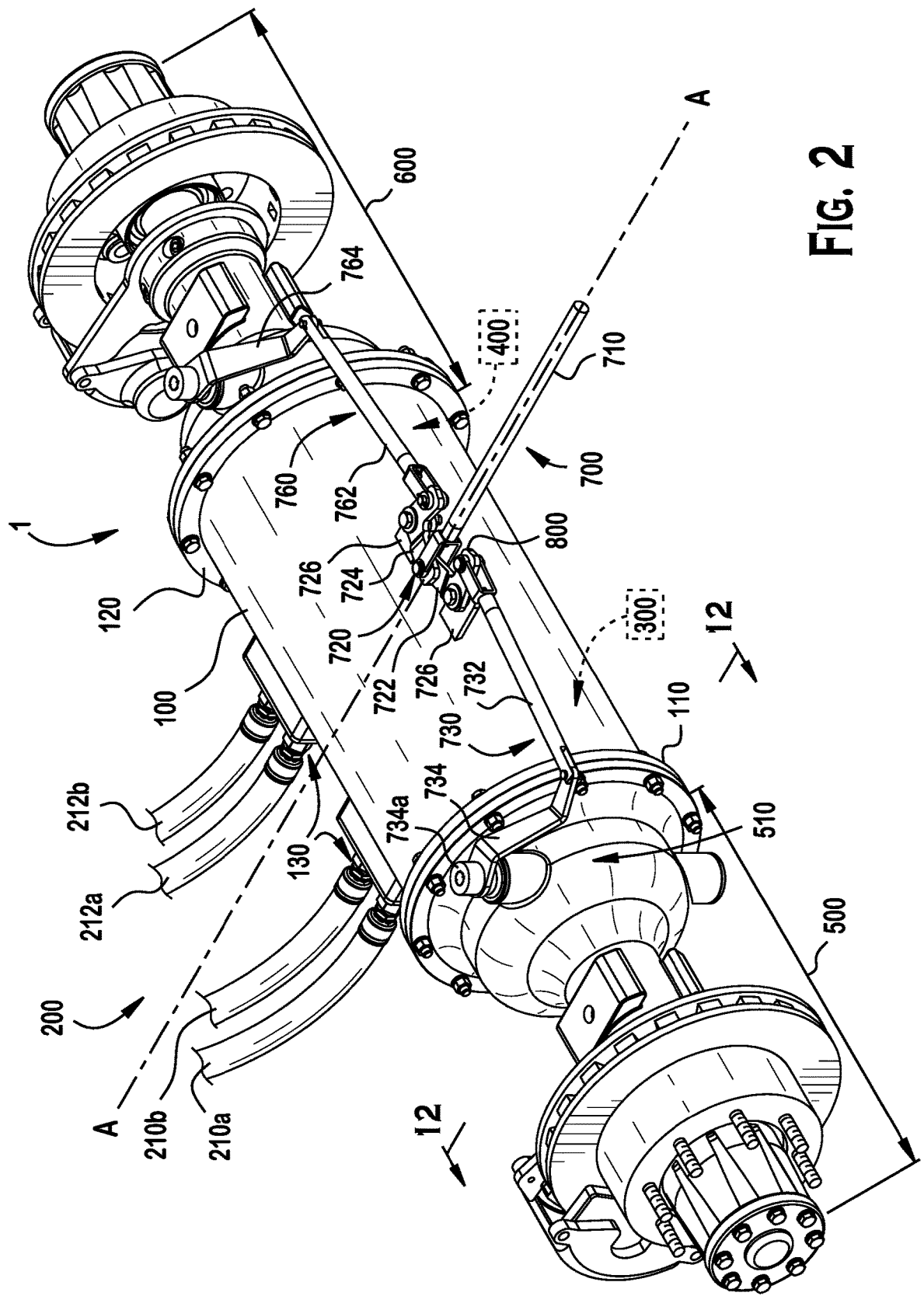
FIG. 2 is a perspective view of a hydraulic drive system according to the invention.

With respect to FIG. 2, the hydraulic drive system 1 according to the invention is shown in greater detail. The hydraulic drive system 1 includes the following major components: a body housing 100, a fluid line assembly 200, a first motor assembly 300, a second motor assembly 400, a first rotor assembly 500, a second rotor assembly 600, and an engagement assembly 700.

A plurality of fasteners 800 are shown in the figures and described below. It should be known to one skilled in the art that the fastener 800 may be a screw, a nut and bolt, a pin and clip, an adhesive, a weld, or any other type of fastener known to those with ordinary skill in the art.

As shown, the hydraulic drive system 1 is symmetrical about an axis A-A shown in FIG. 2. The following description of the hydraulic drive system 1 will reference figures depicting a first half of the hydraulic drive system 1, on one side of the symmetrical axis A-A. Components of an opposite second half of the hydraulic drive system 1 will be described similarly to those on the first half, and are shown in the FIGS. 2, 19-34. The components of the symmetrical second half of the hydraulic drive system 1 are identical to those depicted in the figures for the first half.

Figure 19:
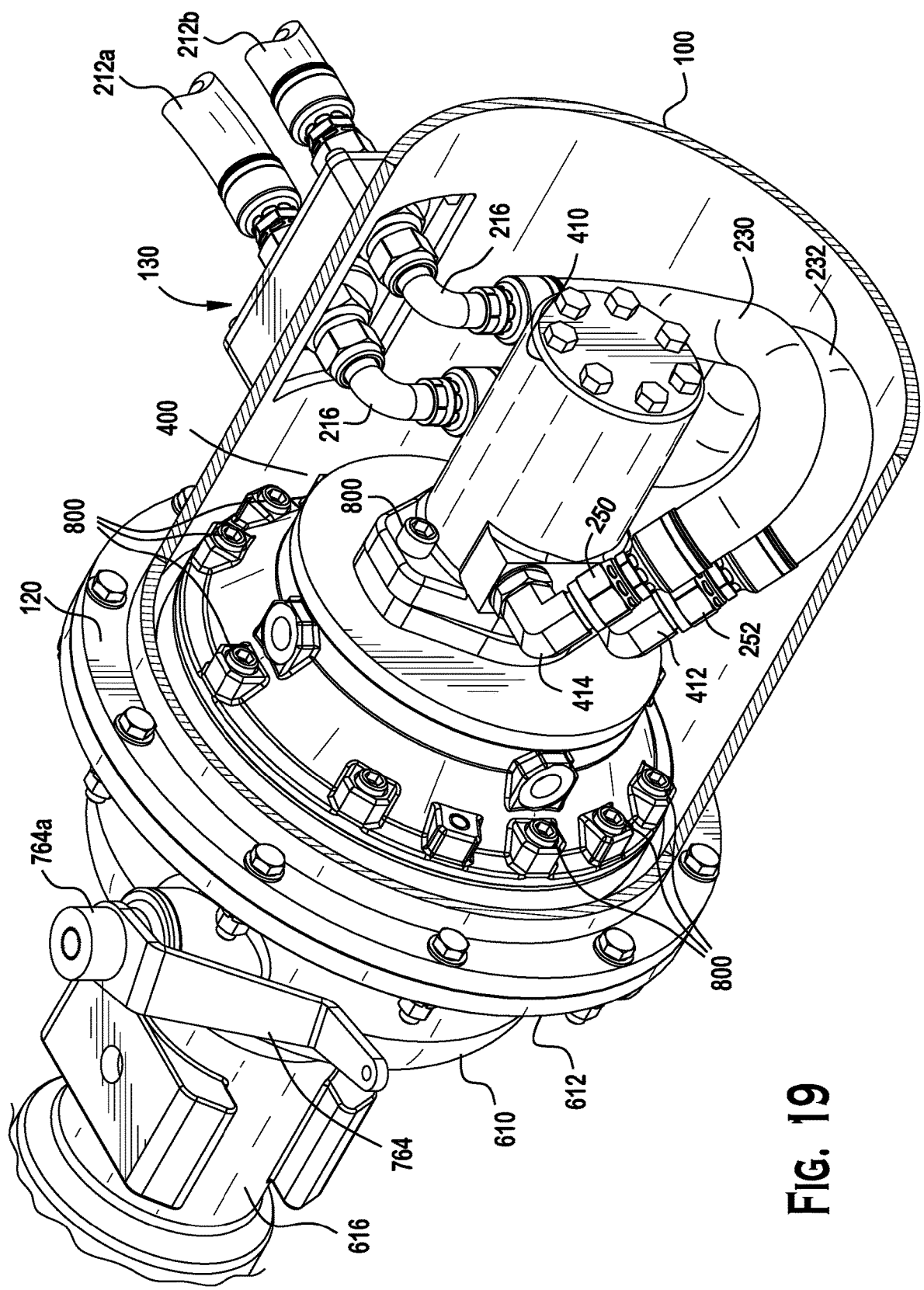
FIG. 19 is a partial sectional view of the hydraulic drive system of FIG. 2.
Figure 20:
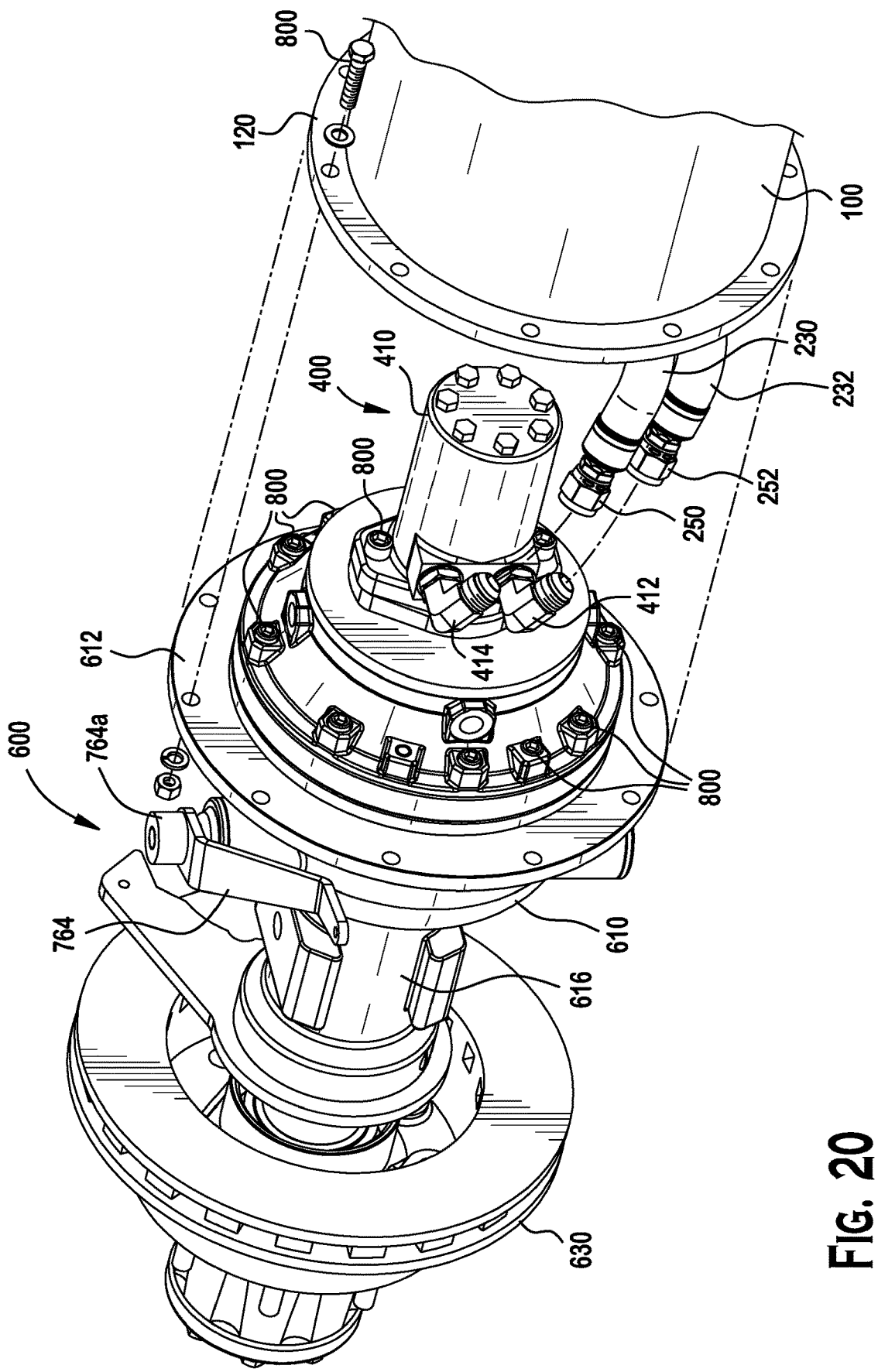
FIG. 20 is an exploded view of a motor assembly, a rotor assembly, and a body housing of the hydraulic drive system of FIG. 2.

The body housing 100 is shown in FIGS. 2, 19 and 20. In the shown embodiment, the body housing 100 is a hollow cylindrical member having a first flange 110 at a first end and a second flange 120 at second end positioned opposite the first end. The body housing 100 also has a plurality of fluid line ports 130 disposed on and extending through a side of the body housing 100.

The fluid line assembly 200 includes a plurality of exterior lines 210, 212, a plurality of wall connectors 214, 216, a plurality of interior lines 220, 222, 230, 232, and a plurality of interior couplings 240, 242, 250, 252. The plurality of exterior lines 210, 212 and plurality of interior lines 220, 222, 230, 232 may be any type of hydraulic fluid line known to those with ordinary skill in the art. The fluid line assembly 200 of one half of the hydraulic drive system 1 are shown in FIGS. 2-4 and the second half is shown in FIGS. 2, 19-20.

As shown in FIG. 2, the exterior lines 210 include two pairs of fluid lines 210a and 210b, for intake and outlet of fluid. While a total of four exterior lines 210, in an alternative embodiment, the exterior lines 210 may be replaced by a single pair of fluid lines 210a and 210b.

Figure 3:
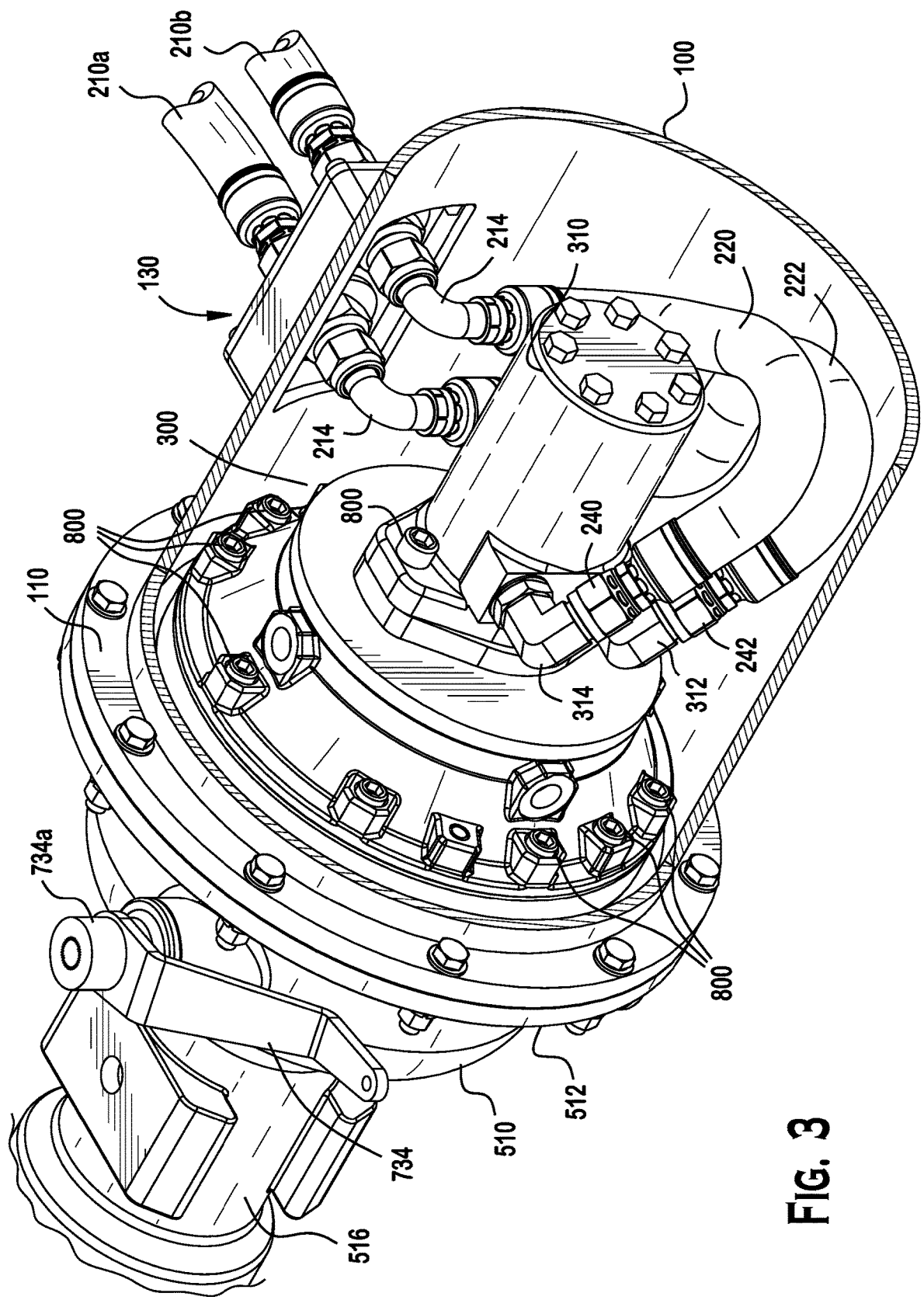
FIG. 3 is a partial sectional view of the hydraulic drive system of FIG. 2.

As shown in FIG. 3, a plurality of first wall connectors 214 are connected at a first end to the plurality of first exterior lines 210 and connected at an opposite second end to a first interior line 220 and a second interior line 222.

Figure 4:
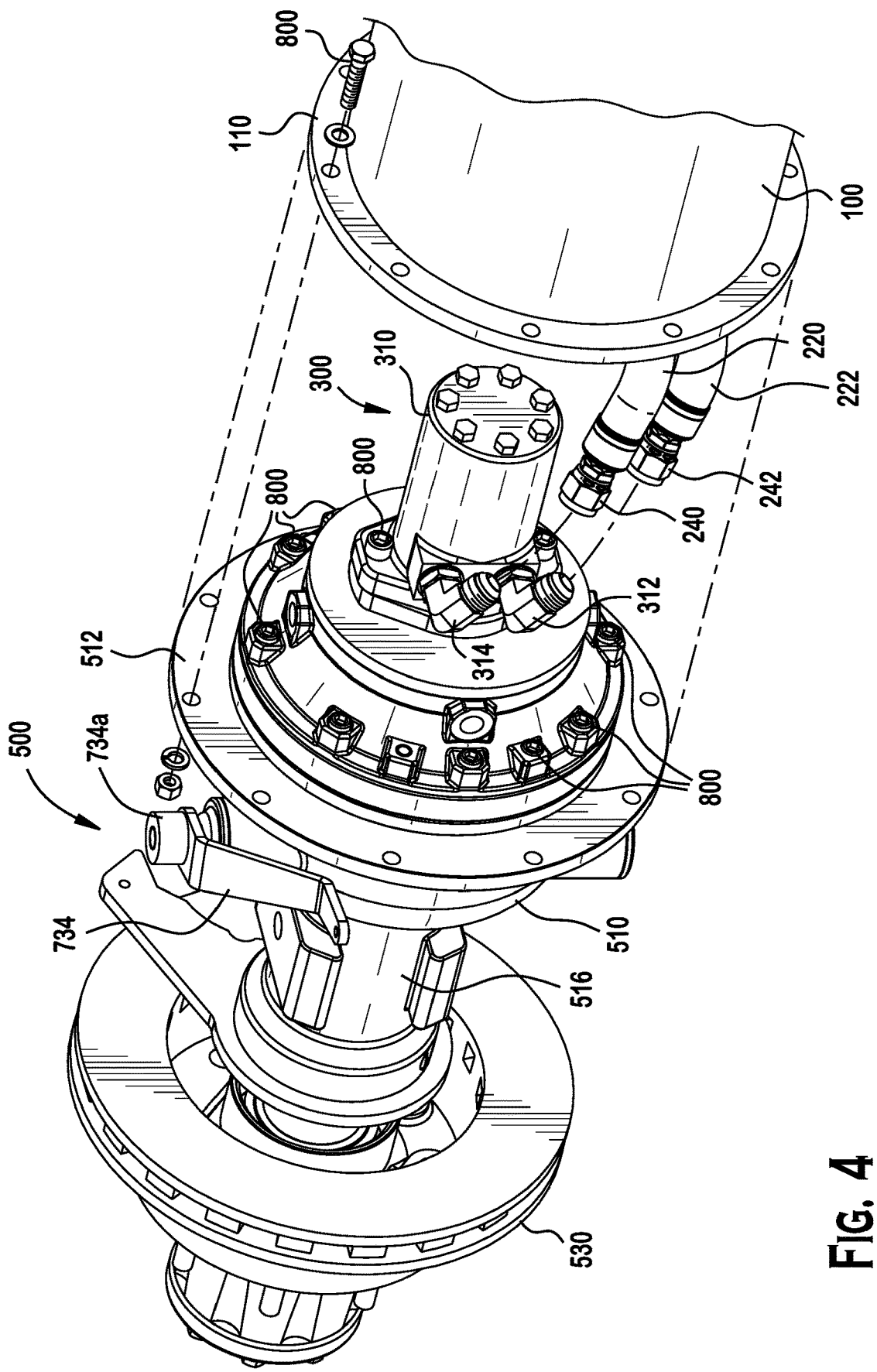
FIG. 4 is an exploded view of a motor assembly, a rotor assembly, and a body housing of the hydraulic drive system of FIG. 2.

As shown in FIGS. 3 and 4, the first interior line 220 is connected to a first interior coupling 240 at an end opposite the first wall connector 214, and the second interior line 222 is connected to a second interior coupling 242 at an end opposite the first wall connector 214.

As shown in FIGS. 2, 14, 15, 19, 27, 30 and 31, a plurality of second exterior lines 212 includes two fluid lines 212a and 212b. In an alternative embodiment, the plurality of second exterior lines 212 may be replaced by a single exterior line 212.

A plurality of second wall connectors 216 are connected at a first end to the plurality of second exterior lines 212 and are connected at an opposite second end to a third interior line 230 and a fourth interior line 232. In the alternative embodiment described above, in which the plurality of second exterior lines 212 are replaced by a single exterior line 212, one second wall connector 216 connects at a first end to the second exterior line 212 and is connected at an opposite second end to the third interior line 230 and the fourth interior line 232.

The third interior line 230 is connected to a third interior coupling 250 at an end opposite the second wall connector 216, and the fourth interior line 232 is connected to a fourth interior coupling 252 at an end opposite the second wall connector 216.

Figure 5:
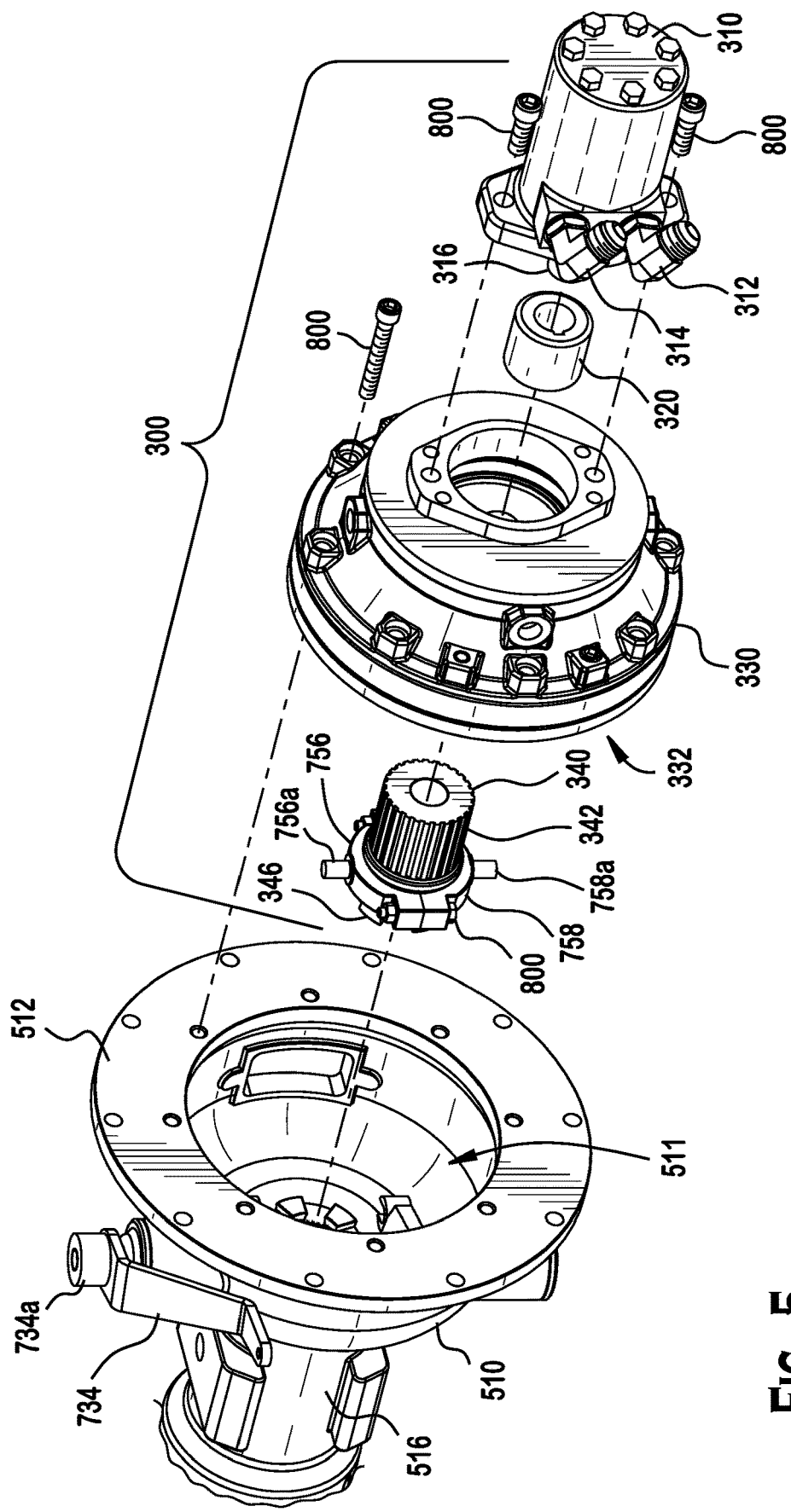
FIG. 5 is an exploded view of the motor assembly of FIG. 3.

The first motor assembly 300 is shown in FIGS. 3-5. As shown in FIG. 5, the first motor assembly 300 includes a first motor 310, a first motor adaptor 320, a first planetary gear drive 330, and a first motor actuator 340.

The first motor 310, as shown in FIG. 5, is a hydraulic motor having a first motor shaft 316 operated by the hydraulic motor. The first motor 310 also has a plurality of first motor couplings 312, 314. The first motor adaptor 320, in the shown embodiment, is a hollow cylindrical member. The first planetary gear drive 330 is a type of planetary gear known to those with ordinary skill in the art, and has a first planetary mating spline 332 extending into a side of the first planetary gear drive 330.

Figure 6:
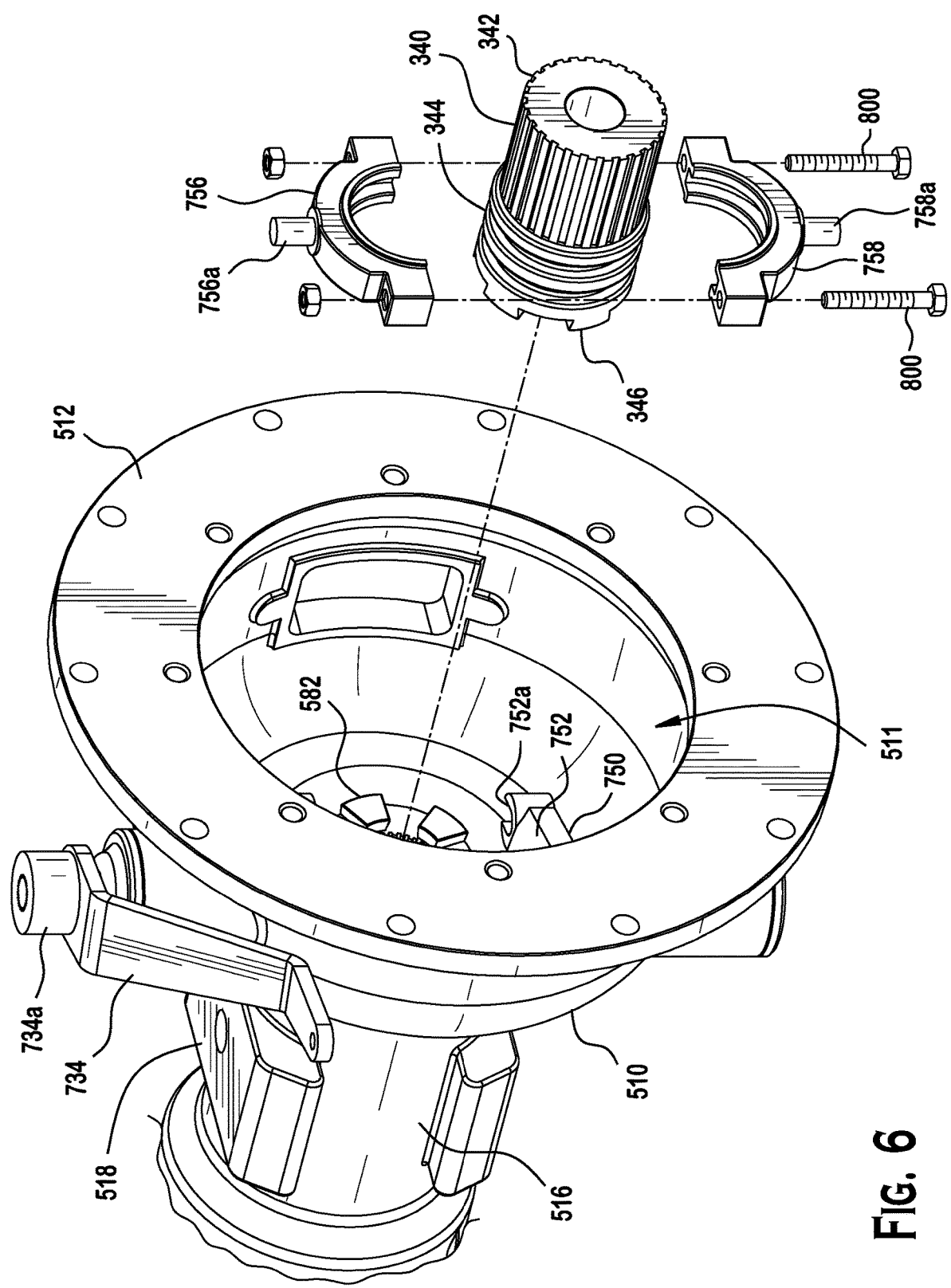
FIG. 6 is an exploded view of a motor actuator of the motor assembly of FIG. 3.

As shown in FIGS. 5 and 6, the first motor actuator 340 has a first motor actuator mating spline 342 disposed on a first end, a plurality of first motor actuator teeth 346 disposed on an opposite second end, and a plurality of first motor actuator ridges 344 disposed between the first end and the second end. The first motor actuator mating spline 342, in the shown embodiment, extends along a longitudinal direction of the first motor actuator 340. The plurality of first motor actuator ridges 344 protrude circumferentially from the first motor actuator 340. The plurality of first motor actuator teeth 346 protrude from the first motor actuator 340 in the longitudinal direction of the first motor actuator 340.

Figure 21:
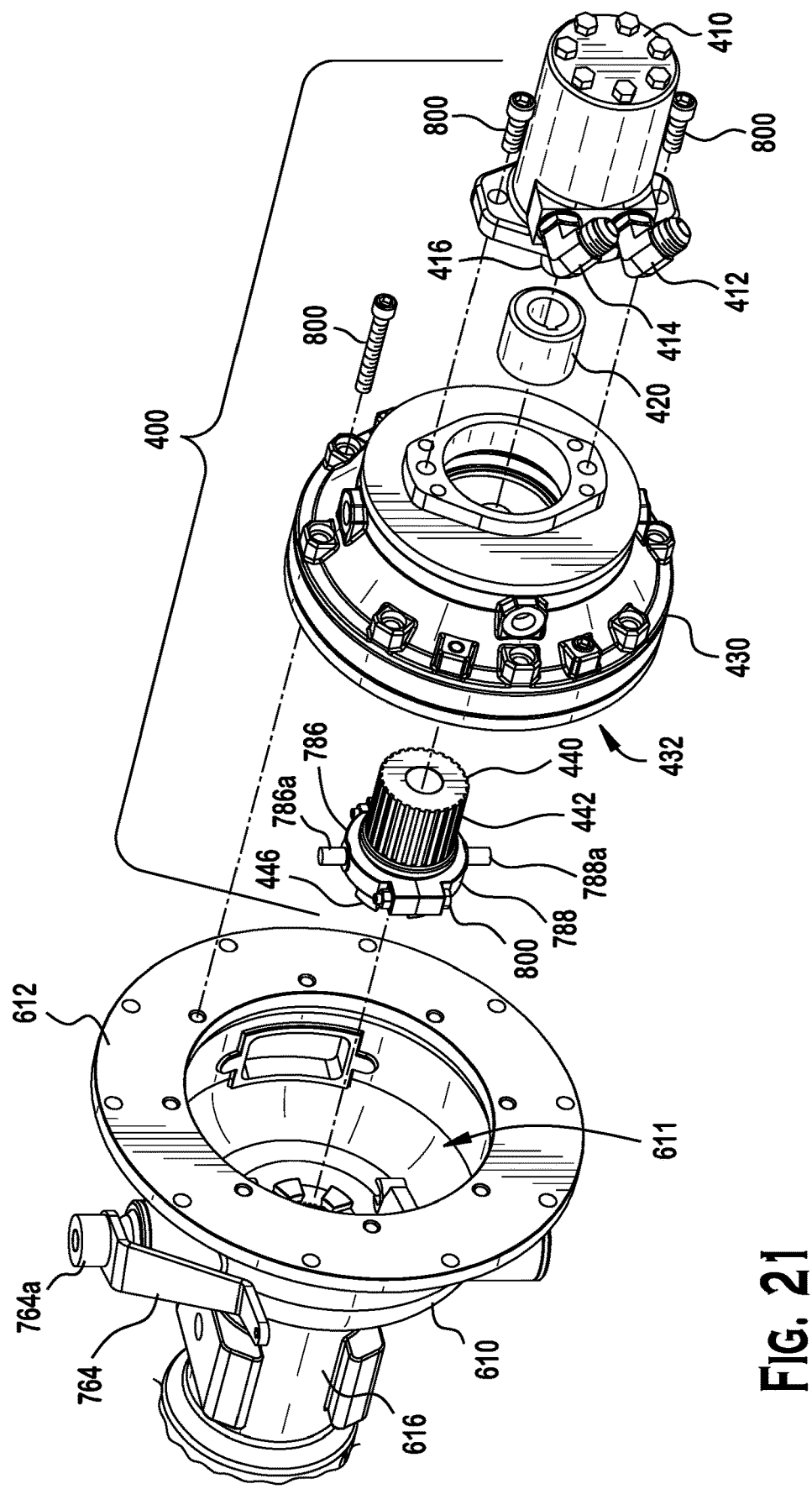
FIG. 21 is an exploded view of the motor assembly of FIG. 19.

As shown in FIGS. 19-21, the second motor assembly 400 includes a second motor 410, a second motor adaptor 420, a second planetary gear drive 430, and a second motor actuator 440.

The second motor 410, as shown in FIG. 21, is a hydraulic motor having a second motor shaft 416 operated by the hydraulic motor. The second motor 410 also has a plurality of second motor couplings 412, 414. The second motor adaptor 420 is a hollow cylindrical member. The second planetary gear drive 430 is a type of planetary gear known to those with ordinary skill in the art, and has a second planetary mating spline 432 extending into a side of the second planetary gear drive 430.

Figure 22:
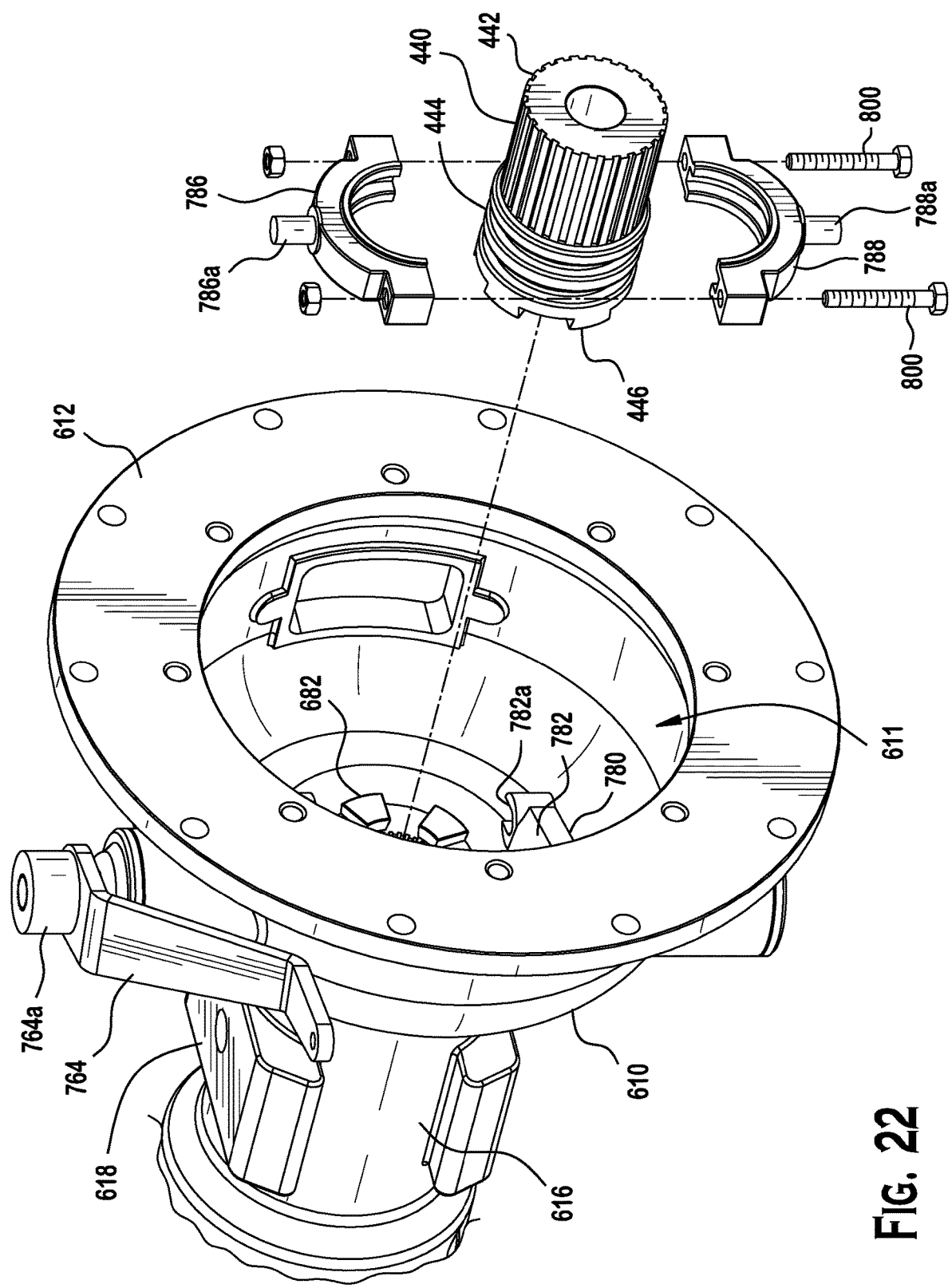
FIG. 22 is an exploded view of a motor actuator of the motor assembly of FIG. 19.

As shown in FIGS. 21 and 22, the second motor actuator 440 has a second motor actuator mating spline 442 disposed on a first end, a plurality of second motor actuator teeth 446 disposed on an opposite second end, and a plurality of second motor actuator ridges 444 disposed between the first end and the second end. The second motor actuator mating spline 442 extends along a longitudinal direction of the second motor actuator 440. The plurality of second motor actuator ridges 444 protrude circumferentially from the second motor actuator 440. The plurality of second motor actuator teeth 446 protrude from the second motor actuator 440 in the longitudinal direction of the second motor actuator 440.

The first rotor assembly 500 is shown in FIGS. 2 and 7-9. The first rotor assembly 500 includes a first bell housing 510, a first rotor 530, a first brake 540, a first hub assembly 550, a first drive shaft 570, and a first rotor actuator assembly 580.

Figure 7:
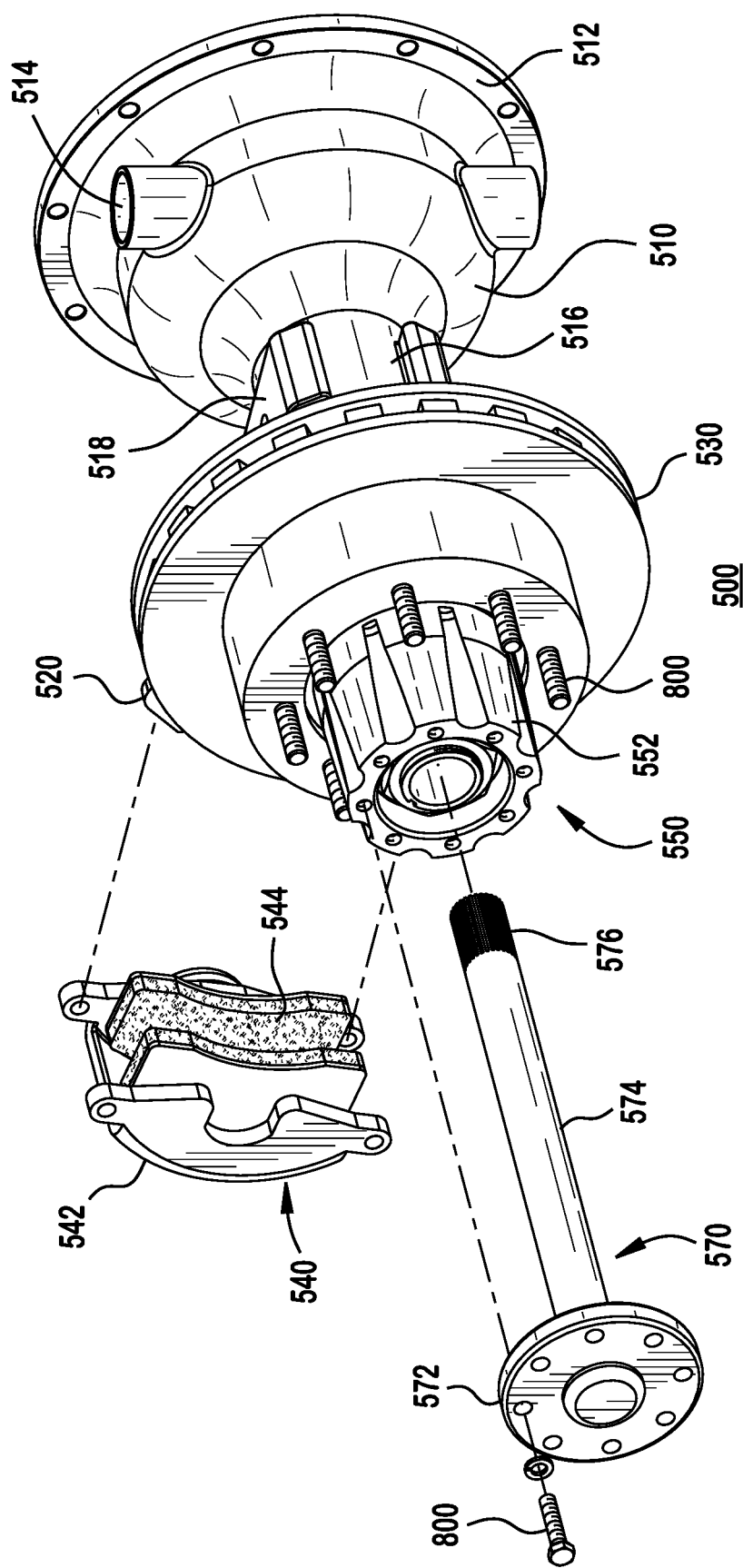
FIG. 7 is an exploded view of the rotor assembly of FIG. 4.
Figure 8:
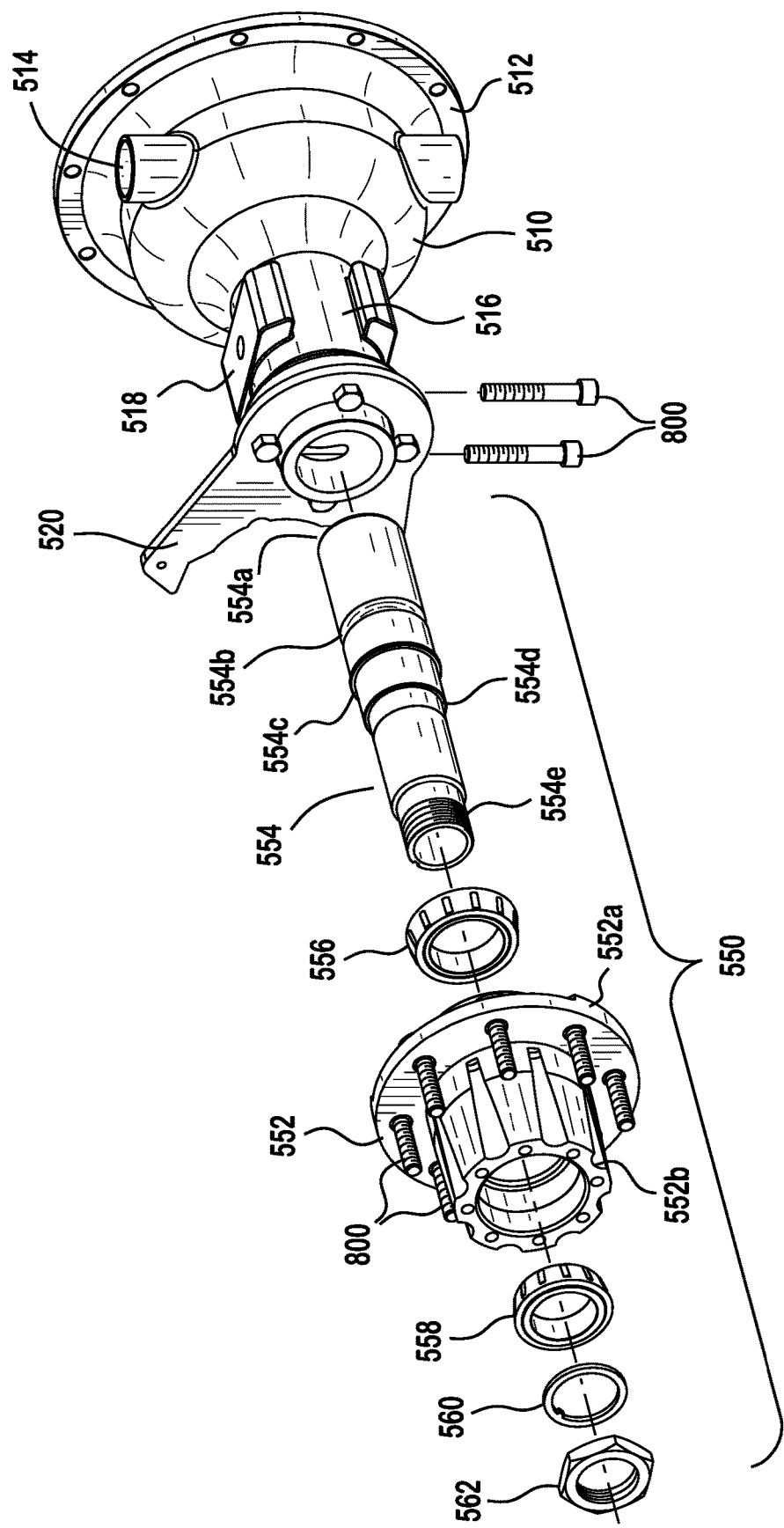
FIG. 8 is an exploded view of a hub assembly of the rotor assembly of FIG. 4.
Figure 9:
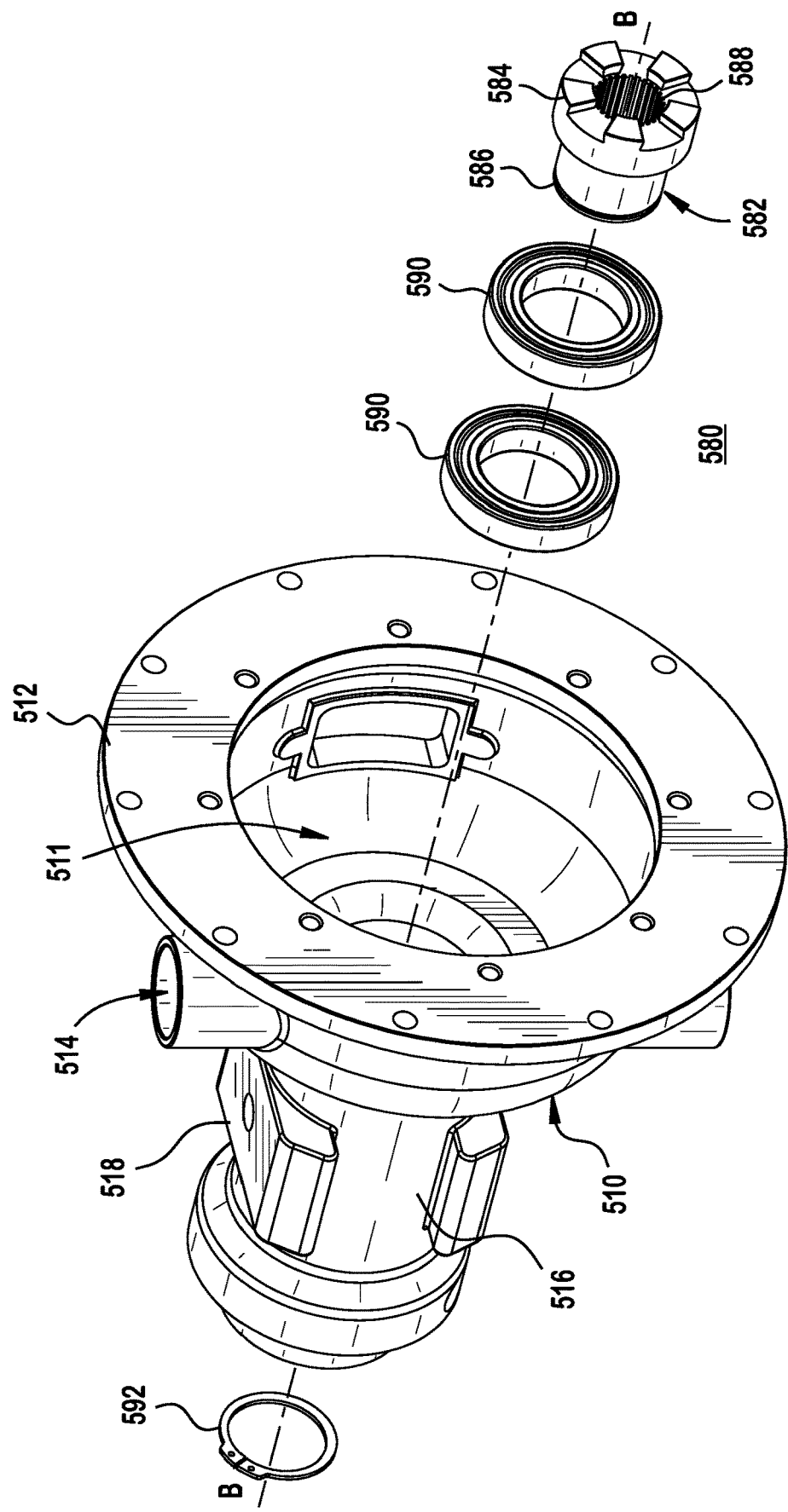
FIG. 9 is an exploded view of a rotor actuator assembly of the rotor assembly of FIG. 4.

The first bell housing 510, as shown in FIGS. 7 and 9, is a bell-shaped member defining a first bell housing receiving space 511 and having a first bell housing flange 512 along a first end thereof. A first shaft receiving passageway 514 extends through the first bell housing 510 in a direction orthogonal to an axis B-B extending through the first bell housing receiving space 511. The first shaft receiving passageway 514 is positioned toward a side, off-center on the first bell housing 510. A tubular first caster housing 516 extends from the first bell housing 510. A first frame support 518 is disposed around the first caster housing 516, forming flat surfaces on a top and a bottom of the first caster housing 516. As shown in FIG. 8, a first brake mount 520 is disposed on an end of the first caster housing 516 opposite the first bell housing 510, and extends away from the first caster housing 516.

The first rotor 530 is shown in FIG. 7. The first rotor 530 may be any type of brake rotor known to those with ordinary skill in the art.

The first brake 540 is shown in FIG. 7 and includes a first brake caliper 542 and a plurality of first brake pads 544 disposed within the first brake caliper 542. The first brake caliper 542 and the plurality of first brake pads 544 may be any type of brake caliper and brake pads known to those with ordinary skill in the art.

The first hub assembly 550 is shown in FIGS. 7 and 8. The first hub assembly 550 includes a first hub housing 552, a first spindle 554, a first inner hub bearing 556, a first outer hub bearing 558, a first hub ring 560, and a first hub retainer 562.

The first hub housing 552, as shown in FIG. 8, has a circular first hub housing base 552*a* and a hollow, cylindrical first hub housing body 552 extending from a side of the first hub housing base 552*a*.

The first spindle 554, as shown in FIG. 8, is a substantially tubular member having a first spindle end 554*a* at a first end and a first spindle securing end 554*e* at an opposite second end. The first spindle securing end 554*e* may have an exterior thread, as in the shown embodiment. The first spindle 554 also has a first spindle groove 554*b*, a first spindle ridge 554*c*, and a first outer spindle surface 554*d* disposed between the first end and the second end. The first spindle groove 554*b* is a groove extending circumferentially around the first spindle 554 adjacent the first end. The first spindle ridge 554*c* protrudes circumferentially around the first spindle 554 and is disposed between the first spindle groove 554*b* and the first spindle securing end 554*e*. The first outer spindle surface 554*d* is a flat surface formed orthogonal to a longitudinal direction of the first spindle 554 and extending circumferentially around the first spindle 554. The first outer spindle surface 554*d* is disposed between the first spindle ridge 554*c* and the first spindle securing end 554*e*.

The first inner hub bearing 556 and the first outer hub bearing 558, as shown in FIG. 8, may be any form of bearing known to those with ordinary skill in the art. The first hub ring 560 is a circular member. The first hub retainer 562 may be a threaded nut, or may be any other form of retainer known to those with ordinary skill in the art.

The first drive shaft 570 is shown in FIG. 7. The first drive shaft 570 has a first drive shaft flange 572 disposed on a first end and a first drive shaft spline 576 disposed on an opposite second end. A first drive shaft body 574 is a cylindrical member extending between the first drive shaft flange 572 and the first drive shaft spline 576.

The first rotor actuator assembly 580 is shown in FIG. 9. The first rotor actuator assembly 580 has a first rotor actuator 582, a plurality of first rotor actuator bearings 590, and a first rotor actuator snap ring 592. The first rotor actuator 582 has a plurality of first rotor actuator teeth 584 disposed on a first end thereof, a first rotor actuator mating end 586 at an opposite second end thereof, and a first rotor actuator spline 588 disposed along an interior of the first rotor actuator 582. The plurality of first rotor actuator teeth 584 protrude from the first rotor actuator 582 in a longitudinal direction of the first rotor actuator 582. The first rotor actuator spline 588 extends along the longitudinal direction of the first rotor actuator 582. The first rotor actuator mating end 586 may have an exterior thread, as in the shown embodiment. The plurality of first rotor actuator bearings 590 may be any type of bearings known to those with ordinary skill in the art. The first actuator snap ring 592 may be any type of snap ring known to those with ordinary skill in the art.

The second rotor assembly 600 is shown in FIGS. 2 and 23-25, includes a second bell housing 610, a second rotor 630, a second brake 640, a second hub assembly 650, a second drive shaft 670, and a second rotor actuator assembly 680.

Figure 23:
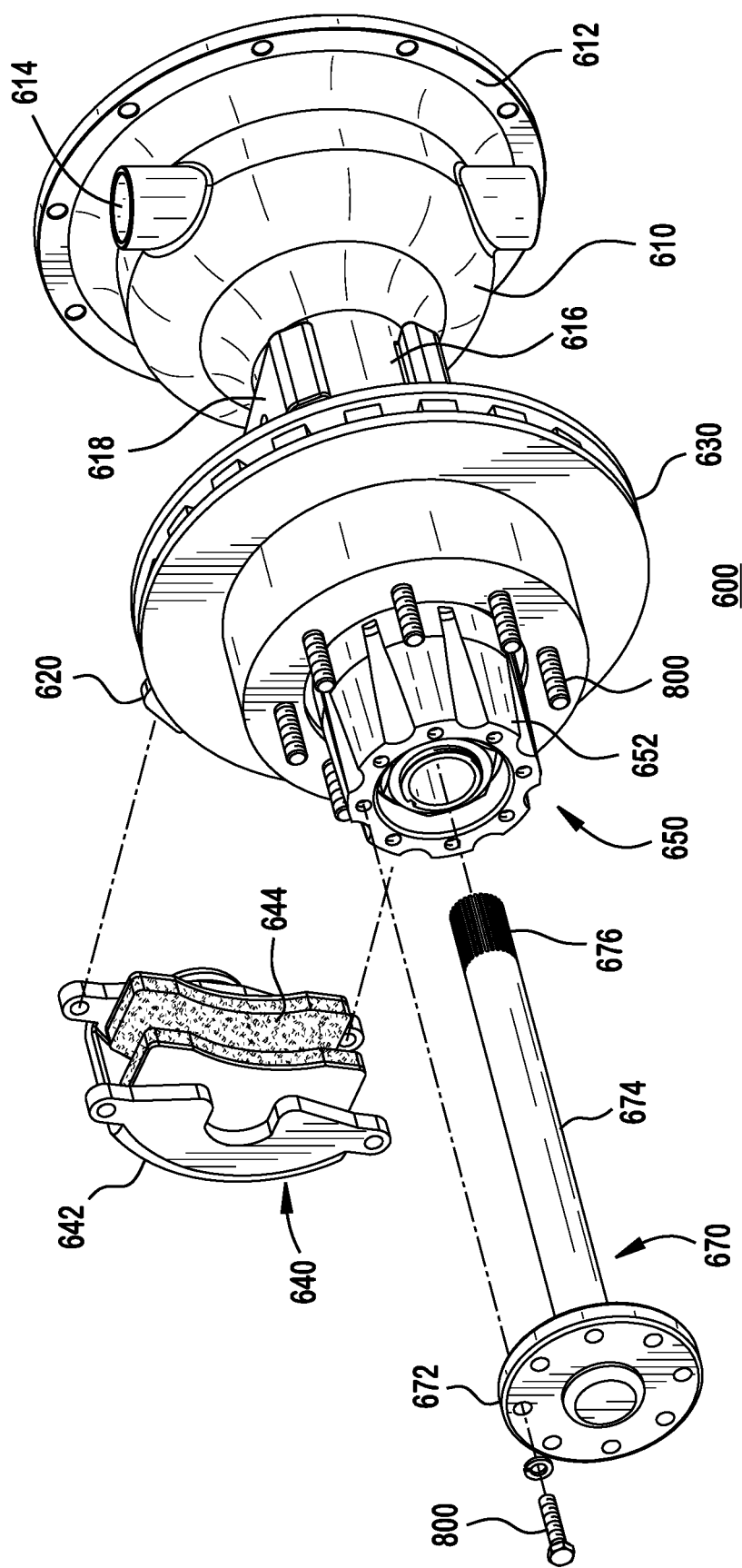
FIG. 23 is an exploded view of the rotor assembly of FIG. 20.
Figure 25:
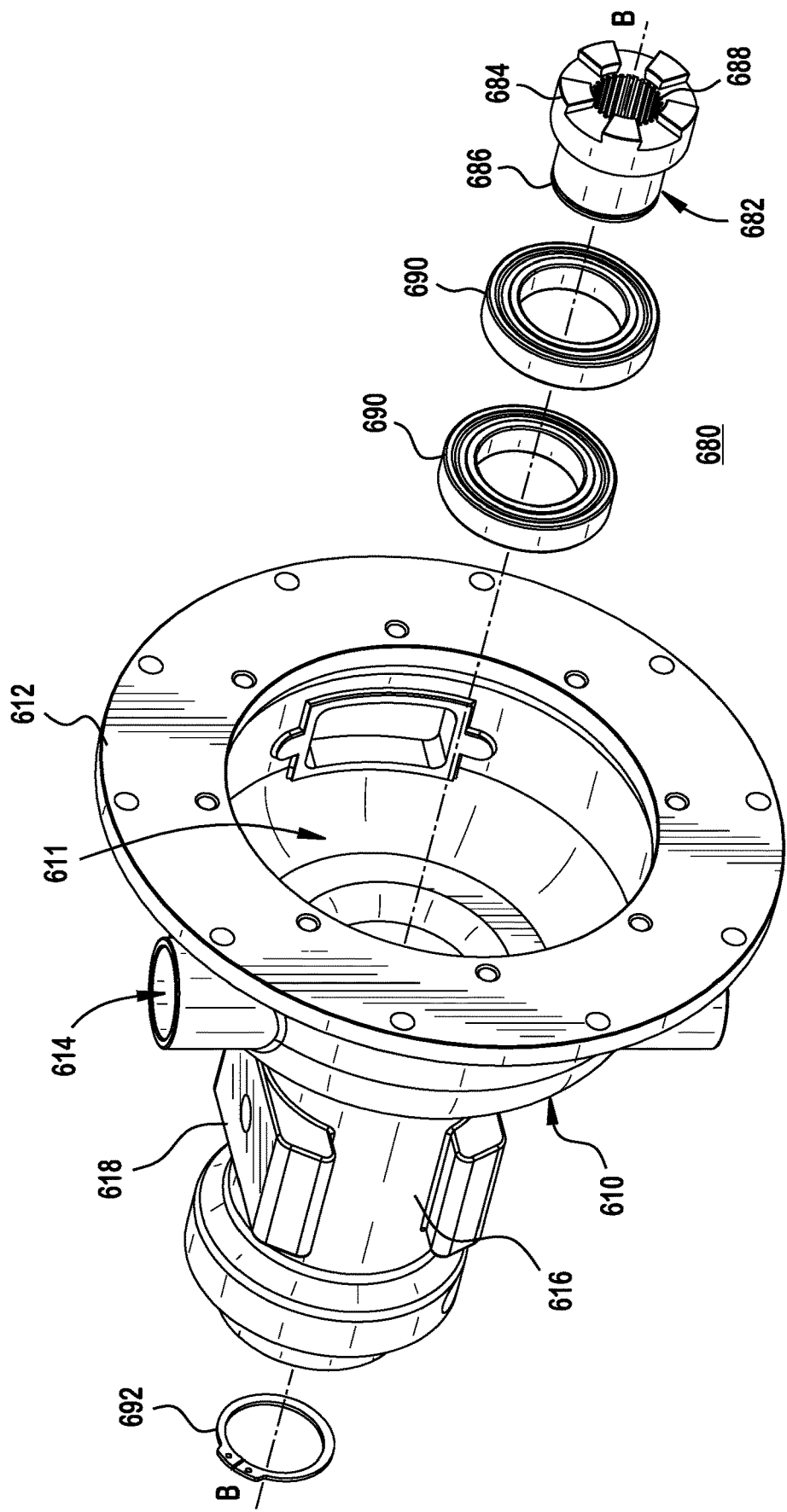
FIG. 25 is an exploded view of a rotor actuator assembly of the rotor assembly of FIG. 20.

The second bell housing 610, as shown in FIGS. 23 and 25, is a bell-shaped member defining a second bell housing receiving space 611 and having a second bell housing flange 612 at a first end. A second shaft receiving passageway 614 extends through the second bell housing 610 in a direction orthogonal to an axis B-B extending through the second bell housing receiving space 611. The second shaft receiving passageway 614 is positioned toward a side, off-center on the second bell housing 610. A tubular second caster housing 616 extends from the second bell housing 610. A second frame support 618 is disposed around the second caster housing 616, forming flat surfaces on a top and a bottom of the second caster housing 616. A second brake mount 620 is disposed on an end of the second caster housing 616 opposite the second bell housing 610, and extends away from the second caster housing 616.

The second rotor 630 is shown in FIG. 23 and may be any type of brake rotor known to those with ordinary skill in the art.

The second brake 640 is shown in FIG. 23 includes a second brake caliper 642 and a plurality of second brake pads 644 disposed within the second brake caliper 642. The second brake caliper 642 and the plurality of second brake pads 644 may be any type of brake caliper and brake pads known to those with ordinary skill in the art.

Figure 24:
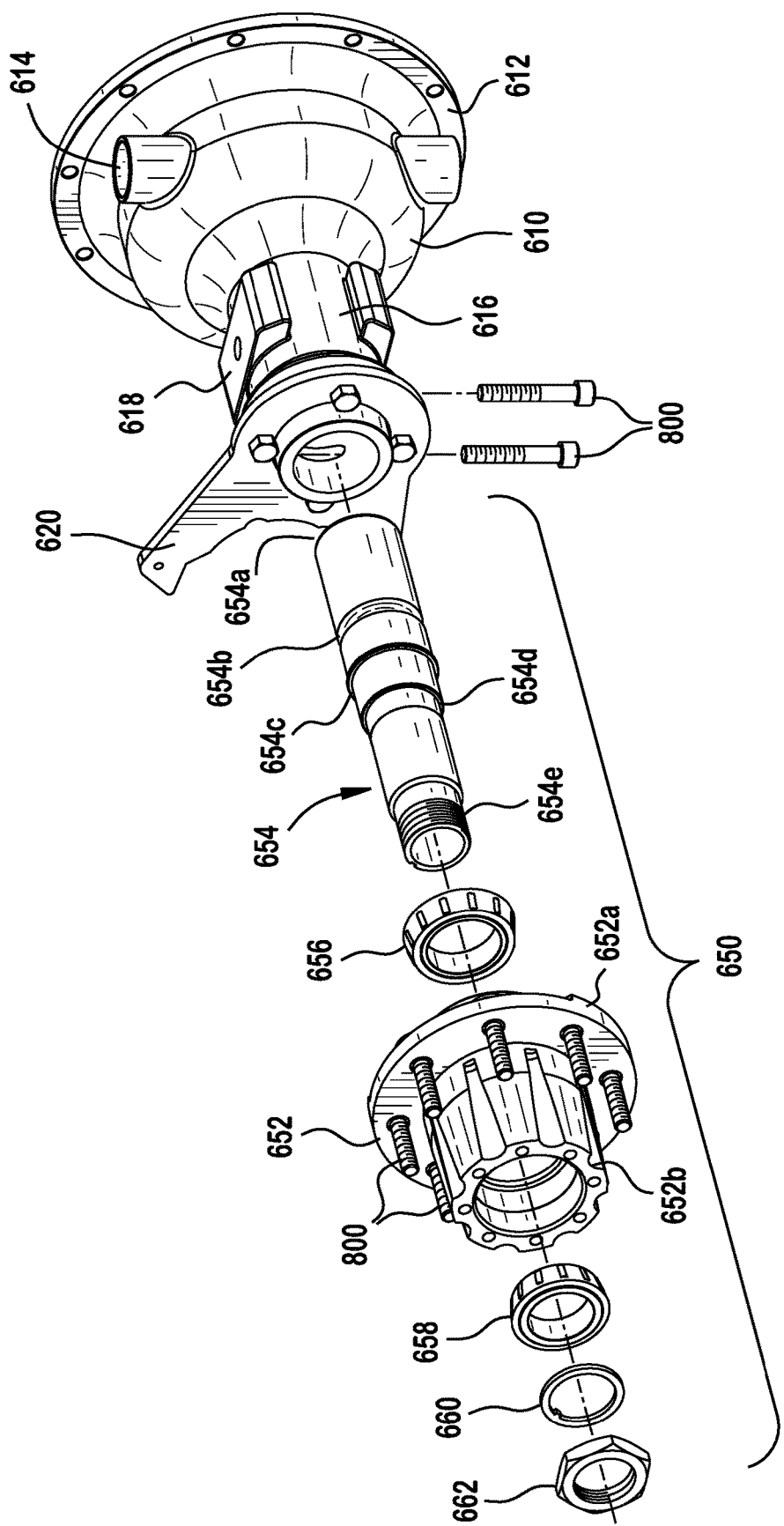
FIG. 24 is an exploded view of a hub assembly of the rotor assembly of FIG. 20.

The second hub assembly 650 is shown in FIGS. 23 and 24 and includes a second hub housing 652, a second spindle 654, a second inner hub bearing 656, a second outer hub bearing 658, a second hub ring 660, and a second hub retainer 662.

The second hub housing 652, as shown in FIG. 24, has a circular second hub housing base 652*a* and a hollow, cylindrical second hub housing body 652 extending from a side of the second hub housing base 652*a*.

The second spindle 654, as shown in FIG. 24, is a substantially tubular member having a second spindle end 654*a* at a first end and a second spindle securing end 654*e* at an opposite second end. The second spindle securing end 654*e* may have an exterior thread. The second spindle 654 also has a second spindle groove 654*b*, a second spindle ridge 654*c*, and a second outer spindle surface 654*d* disposed between the first end and the second end. The second spindle groove 654*b* is a groove extending circumferentially around the second spindle 654 adjacent the first end. The second spindle ridge 654*c* protrudes circumferentially around the second spindle 654 and is disposed between the second spindle groove 654*b* and the second spindle securing end 654*e*.

The second outer spindle surface 654*d* is a flat surface formed orthogonal to a longitudinal direction of the second spindle 654 and extending circumferentially around the second spindle 654. The second outer spindle surface 654*d* is disposed between the second spindle ridge 654c and the second spindle securing end 654e.

The second inner hub bearing 656 and the second outer hub bearing 658 may be any form of bearing known to those with ordinary skill in the art. The second hub ring 660 is a circular member. The second hub retainer 662 may be a threaded nut, or may be any other form of retainer known to those with ordinary skill in the art.

The second drive shaft 670 is shown in FIG. 23 and has a second drive shaft flange 672 disposed on a first end and a second drive shaft spline 676 disposed on an opposite second end. A second drive shaft body 674 is a cylindrical member extending between the second drive shaft flange 672 and the second drive shaft spline 676.

The second rotor actuator assembly 680 is shown in FIG. 25 has a second rotor actuator 682, a plurality of second rotor actuator bearings 690, and a second rotor actuator snap ring 692. The second rotor actuator 682 has a plurality of second rotor actuator teeth 684 disposed on a first end, a second rotor actuator mating end 686 at an opposite second end, and a second rotor actuator spline 688 disposed along an interior of the second rotor actuator 682. The plurality of second rotor actuator teeth 684 protrude from the second rotor actuator 682 in a longitudinal direction of the second rotor actuator 682. The second rotor actuator spline 688 extends along the longitudinal direction of the second rotor actuator 682. The second rotor actuator mating end 686 may have an exterior thread. The plurality of second rotor actuator bearings 690 may be any type of bearings known to those with ordinary skill in the art. The second actuator snap ring 692 may be any type of snap ring known to those with ordinary skill in the art.

Figure 10:
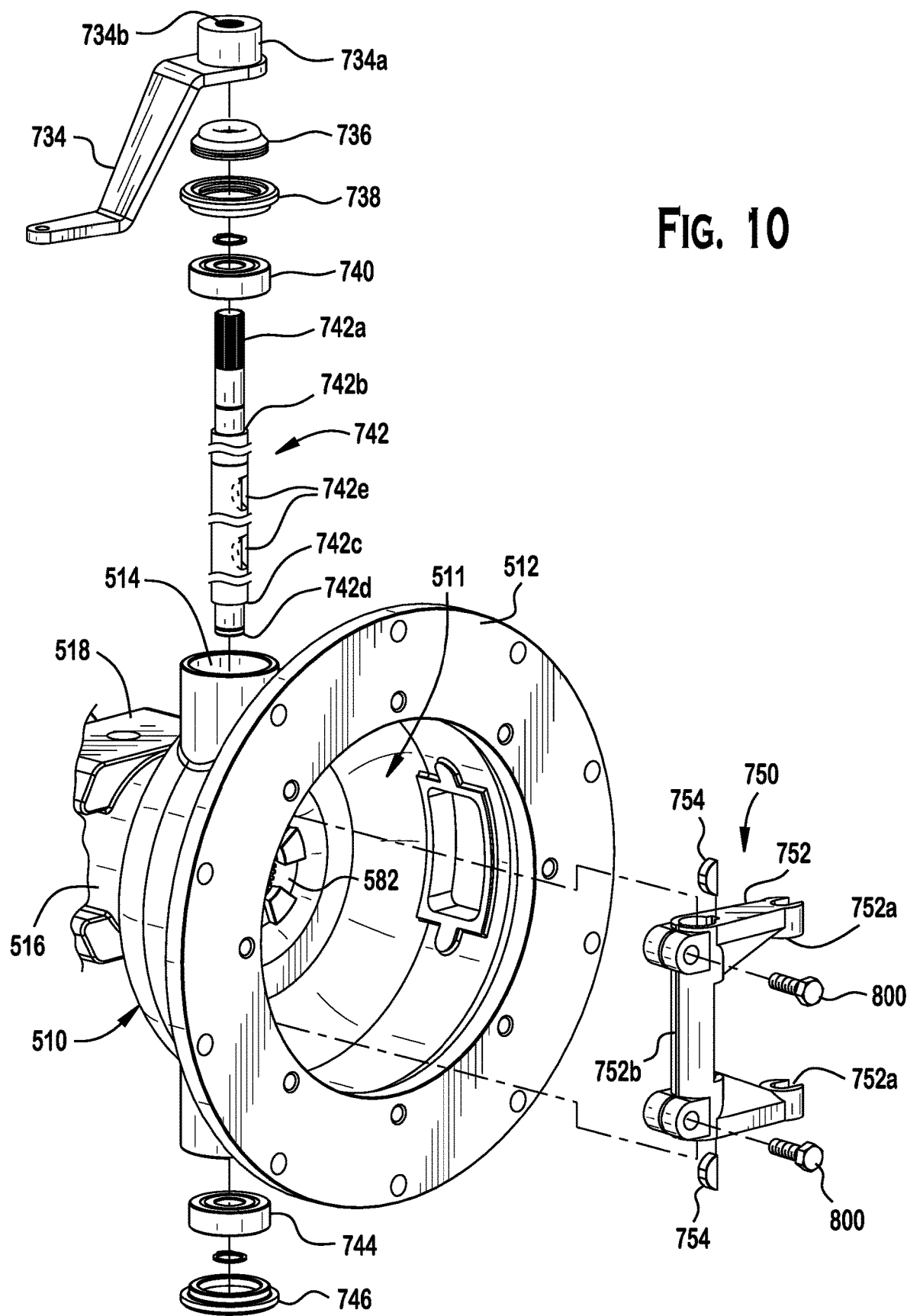
FIG. 10 is an exploded view of a lever assembly of the hydraulic drive system of FIG. 1.

The engagement assembly 700 is shown in FIGS. 2, 6, and 10. The engagement assembly 700 includes a main shaft 710, a pivot coupling 720, a first lever assembly 730, and a second lever assembly 760.

As shown in FIG. 2, the main shaft 710 is an elongated cylindrical member. The pivot coupling 720 has a first pivot arm 722, a second pivot arm 724, and a plurality of pivot bases 726. In the shown embodiment, the first pivot arm 722 and the second pivot arm 724 are L-shaped members, and the plurality of pivot bases 726 are formed as tabs.

The first lever assembly 730 is shown in FIGS. 2, 6, and 10. The first lever assembly 730 has a first pivot rod 732, a first engagement lever 734, a first lever seal 736, a first lever upper snap ring 738, a first lever upper bearing 740, a first engagement shaft 742, a first lever lower bearing 744, a first lever lower snap ring 746, and a first actuator pivot assembly 750.

The first pivot rod 732, as shown in FIG. 2, is an elongated cylindrical member. The first engagement lever 734 has a first engagement lever protrusion 734a at an end. The first engagement lever protrusion 734a is a tubular member extending from the first engagement lever 734, and has a first engagement lever spline 734b disposed along an interior.

The first lever seal 736 may be a circular rubber seal or any other type of seal known to those with ordinary skill in the art. The first lever upper snap ring 738 and the first lever lower snap ring 746 may be any type of snap ring known to those with ordinary skill in the art. The first lever upper bearing 740 and the first lever lower bearing 744 may be any type of bearing known to those with ordinary skill in the art.

The first engagement shaft 742, as shown in FIG. 10, is a tubular member having a first engagement shaft spline 742a at a first end and a first engagement shaft grommet 742d at an opposite second end. The first engagement shaft spline 742a extends along a longitudinal direction of the first engagement shaft 742. The first engagement shaft grommet 742d protrudes circumferentially around the first engagement shaft 742. The first engagement shaft 742 also has a first engagement shaft upper surface 742b and a first engagement shaft lower surface 742c disposed between the first end and the second end. The first engagement shaft upper surface 742b extends circumferentially around the first engagement shaft 742 and perpendicularly to the first engagement shaft 742 adjacent the first end. The first engagement shaft lower surface 742c extends circumferentially around the first engagement shaft 742 and perpendicularly to the first engagement shaft 742, and is disposed adjacent the first engagement shaft grommet 742d. The first engagement shaft 742 also has a plurality of first engagement shaft keyways 742e formed as indentations extending into the first engagement shaft 742 between the first engagement shaft upper surface 742b and the first engagement shaft lower surface 742c.

The first actuator pivot assembly 750 is shown in FIGS. 6 and 10. The first actuator pivot assembly 750 includes a first yoke 752, a plurality of first yoke keys 754, a first upper actuator collar 756, and a first lower actuator collar 758. The first yoke 752 is a U-shaped member having a pair of first yoke arms 752a extending in parallel from opposite ends of a first yoke body 752b. The plurality of first yoke keys 754 are disposed within the first yoke body 752b. The first upper actuator collar 756 and the first lower actuator collar 758, shown in FIG. 6, are U-shaped members. The first upper actuator collar 756 has a cylindrical first upper actuator collar protrusion 756a extending from an approximate center of the first upper actuator collar 756. The first lower actuator collar 758 has a cylindrical first lower actuator collar protrusion 758a extending from an approximate center of the first lower actuator collar 758.

Figure 26:
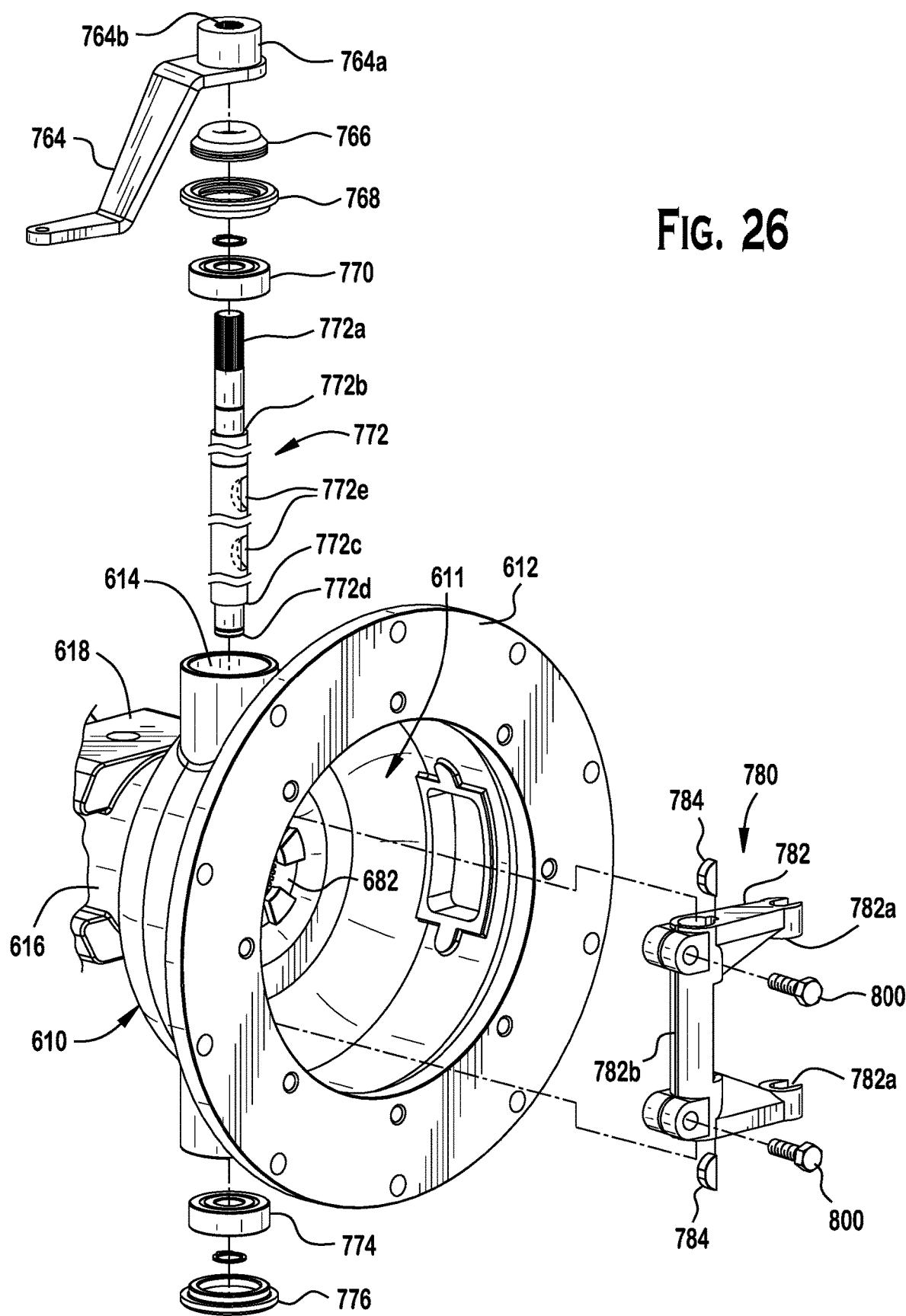
FIG. 26 is an exploded view of a lever assembly of the hydraulic drive system of FIG. 1.

The second lever assembly 760 is shown in FIGS. 2, 22, and 26. The second lever assembly 760 has a second pivot rod 762, a second engagement lever 764, a second lever seal 766, a second lever upper snap ring 768, a second lever upper bearing 770, a second engagement shaft 772, a second lever lower bearing 774, a second lever lower snap ring 776, and a second actuator pivot assembly 780.

The second pivot rod 762, as shown in FIG. 2, is an elongated cylindrical member. The second engagement lever 764 has a second engagement lever protrusion 764a at an end. The second engagement lever protrusion 764a is a tubular member extending from the second engagement lever 764, and has a second engagement lever spline 764b disposed along an interior.

The second lever seal 766 may be a circular rubber seal or any other type of seal known to those with ordinary skill in the art. The second lever upper snap ring 768 and the second lever lower snap ring 776 may be any type of snap ring known to those with ordinary skill in the art. The second lever upper bearing 770 and the second lever lower bearing 774 may be any type of bearing known to those with ordinary skill in the art.

The second engagement shaft 772, as shown in FIG. 26, is a tubular member having a second engagement shaft spline 772a at a first end and a second engagement shaft grommet 772d at an opposite second end. The second engagement shaft spline 772a extends along a longitudinal direction of the second engagement shaft 772. The second engagement shaft grommet 772d protrudes circumferentially around the second engagement shaft 772. The second engagement shaft 772 also has a second engagement shaft upper surface 772b and a second engagement shaft lower surface 772c disposed between the first end and the second end. The second engagement shaft upper surface 772b extend circumferentially around the second engagement shaft 772 and perpendicularly to the second engagement shaft 772 adjacent the first end. The second engagement shaft lower surface 772c extends circumferentially around the second engagement shaft 772 and perpendicularly to the second engagement shaft 772, and is disposed adjacent the second engagement shaft grommet 772d. The second engagement shaft 772 also has a plurality of second engagement shaft keyways 772e formed as indentations extending into the second engagement shaft 772 between the second engagement shaft upper surface 772b and the second engagement shaft lower surface 772c.

The second actuator pivot assembly 780 is shown in FIGS. 22 and 26 includes a second yoke 782, a plurality of second yoke keys 784, a second upper actuator collar 786, and a second lower actuator collar 788. The second yoke 782 is a U-shaped member having a pair of second yoke arms 782a extending in parallel from opposite ends of a second yoke body 782b. The plurality of second yoke keys 784 are disposed within the second yoke body 782b. The second upper actuator collar 786 and the second lower actuator collar 788, shown in FIG. 22, are U-shaped members. The second upper actuator collar 786 has a cylindrical second upper actuator collar protrusion 786a extending from an approximate center of the second upper actuator collar 786. The second lower actuator collar 788 has a cylindrical second lower actuator collar protrusion 788a extending from an approximate center of the second lower actuator collar 788.

Assembly of the hydraulic drive system 1 according to an exemplary embodiment of the invention will now be described in greater detail with reference to FIGS. 2-13.

As shown in FIGS. 2 and 3, the plurality of first exterior lines 210 extend from outside the body housing 100 to the plurality of fluid line ports 130. The plurality of first wall connectors 214 are positioned in the plurality of fluid line ports 130 and connect the plurality of first exterior lines 210 with the first interior line 220 and the second interior line 222 positioned inside the body housing 100.

Figure 11:
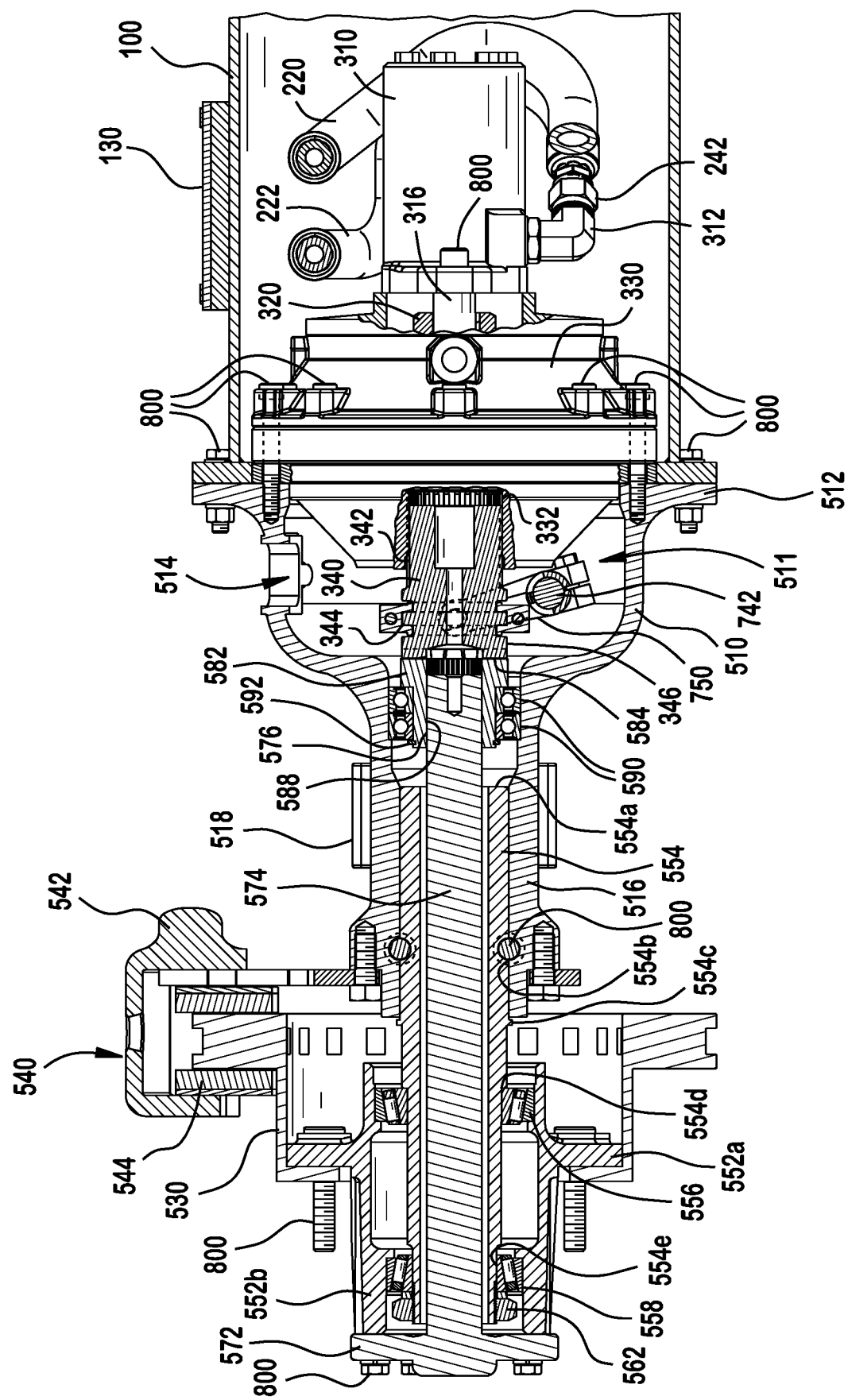
FIG. 11 is a partial sectional view of the hydraulic drive system of FIG. 1, showing one half thereof.

The first motor assembly 300, as shown in FIGS. 3-5, is positioned inside the body housing 100. As shown in FIGS. 3 and 4, the first interior coupling 240 connects the first interior line 220 to the first motor coupling 314, and the second interior coupling 242 connects the second interior line 222 to the first motor coupling 312. As shown in FIGS. 3, 5, and 11, a plurality of fasteners 800 attach the first motor 310 to a first side of the first planetary gear drive 330. The first motor shaft 316 extends into the first planetary gear drive 330, and is surrounded by the first motor adaptor 320, which permits the first motor 310 to engage with and operate the first planetary gear drive 330. The first motor actuator 340 is disposed in an opposite second side of the first planetary gear drive 330, with the first motor actuator mating spline 342 mating with the first planetary mating spline 332. Due to the mating of the first motor actuator mating spline 342 and the first planetary mating spline 332, the first motor actuator 340 is movable with respect to the first planetary gear drive 330 in a direction of the longitudinal axis of the first motor actuator 340.

As shown in FIGS. 4, 5 and 11, a plurality of fasteners 800 attach the second side of the first planetary gear drive 330 to the first bell housing flange 512. The first motor actuator 340 and a portion of the first planetary gear drive 330 are disposed in the first bell housing receiving space 511. The body housing 100, as shown in FIGS. 4 and 11, is also attached to the first bell housing flange 512 by a plurality of fasteners 800, with the body housing 100 positioned around the first planetary gear drive 330 and containing the first motor assembly 300.

The first rotor actuator 582 is disposed in the first bell housing receiving space 511, as shown in FIGS. 9 and 11, with the first rotor actuator teeth 584 facing the first motor actuator teeth 346. The plurality of first rotor actuator bearings 590 are secured to the first rotor actuator 582 by the first rotor actuator snap ring 592. The first rotor actuator 582 is secured to the first bell housing 510 within the first bell housing receiving space 511 by the plurality of first rotor actuator bearings 590, and the first rotor actuator 582 is rotatable within the plurality of first rotor actuator bearings 590 and with respect to the first bell housing 510.

The first hub assembly 550 is assembled with the first rotor assembly 500 as shown in FIGS. 8 and 11. The first spindle end 554a and the first spindle groove 554b are disposed within the first caster housing 516, with the first spindle ridge 554c abutting an end of the first caster housing 516. A plurality of fasteners 800 extend through the first caster housing 516, abutting the first spindle ridge 554c and disposed within each first spindle groove 554b to secure the first spindle 554 with respect to the first caster housing 516. The first outer spindle surface 554d and the first spindle securing end 554e are disposed outside of the first caster housing 516. The first inner hub bearing 556 is positioned around the first spindle 554 and abuts the first outer spindle surface 554d. The first hub housing base 552a is disposed around and abuts the first inner hub bearing 556. The first outer hub bearing 558 is positioned around the first spindle 554 adjacent the second end and is disposed between the first hub housing body 552b and the first spindle 554. The first outer hub bearing 558 is secured to the first spindle 554 by the first hub ring 560 and the first hub retainer 562 mating with the first spindle securing end 554e. Due to both the first inner hub bearing 556 and the first outer hub bearing 558 being disposed between the first hub housing 552 and the first spindle 554, the first hub housing 552 is rotatable with respect to the first spindle 554.

As shown in FIGS. 7 and 11, the first rotor 530 is attached to the first hub housing base 552a by a plurality of fasteners 800. The first rotor 530 is thus also rotatable with respect to the first spindle 554. The first brake 540 is disposed on the first rotor 530 with the first brake pads 544 adjacent the first rotor 530 on each side of the first rotor 530 and the first brake caliper 542 disposed around the first brake pads 544. A side of the first brake caliper 542 is attached at each end to the first brake mount 520. The first brake 540 is secured to the first caster housing 516 and the first rotor 530 can rotate within the first brake 540.

The first drive shaft flange 572 is attached to the first hub housing body 552b by a plurality of fasteners 800, as shown in FIGS. 7 and 11, and the first drive shaft body 574 extends through the first spindle 554. The first drive shaft spline 576 mates with the first rotor actuator spline 588 such that the first drive shaft 570, the first hub housing 552, and the first rotor 530 rotate with the first rotor actuator 582.

As shown in FIG. 2, the main shaft 710 is positioned outside of the body housing 100 and attached along a first end to a first end of the first pivot arm 722 and a first end of the second pivot arm 724. The plurality of pivot bases 726 are attached to an exterior of the body housing 100, and a center of each of the first pivot arm 722 and the second pivot arm 724 is pivotably attached to one of the plurality of pivot bases 726 by a fastener 800.

An opposite second end of the first pivot arm 722, as shown in FIG. 2, is pivotably attached to the first pivot rod 732 which extends outside of the body housing 100 from the first pivot arm 722 to the first engagement lever 734. The first pivot rod 732 is attached to an end of the first engagement lever 734 opposite the first engagement lever protrusion 734a. The first engagement lever 734 is disposed on the first bell housing 510 with the first engagement lever protrusion 734a disposed over the first shaft receiving passageway 514.

Figure 12:
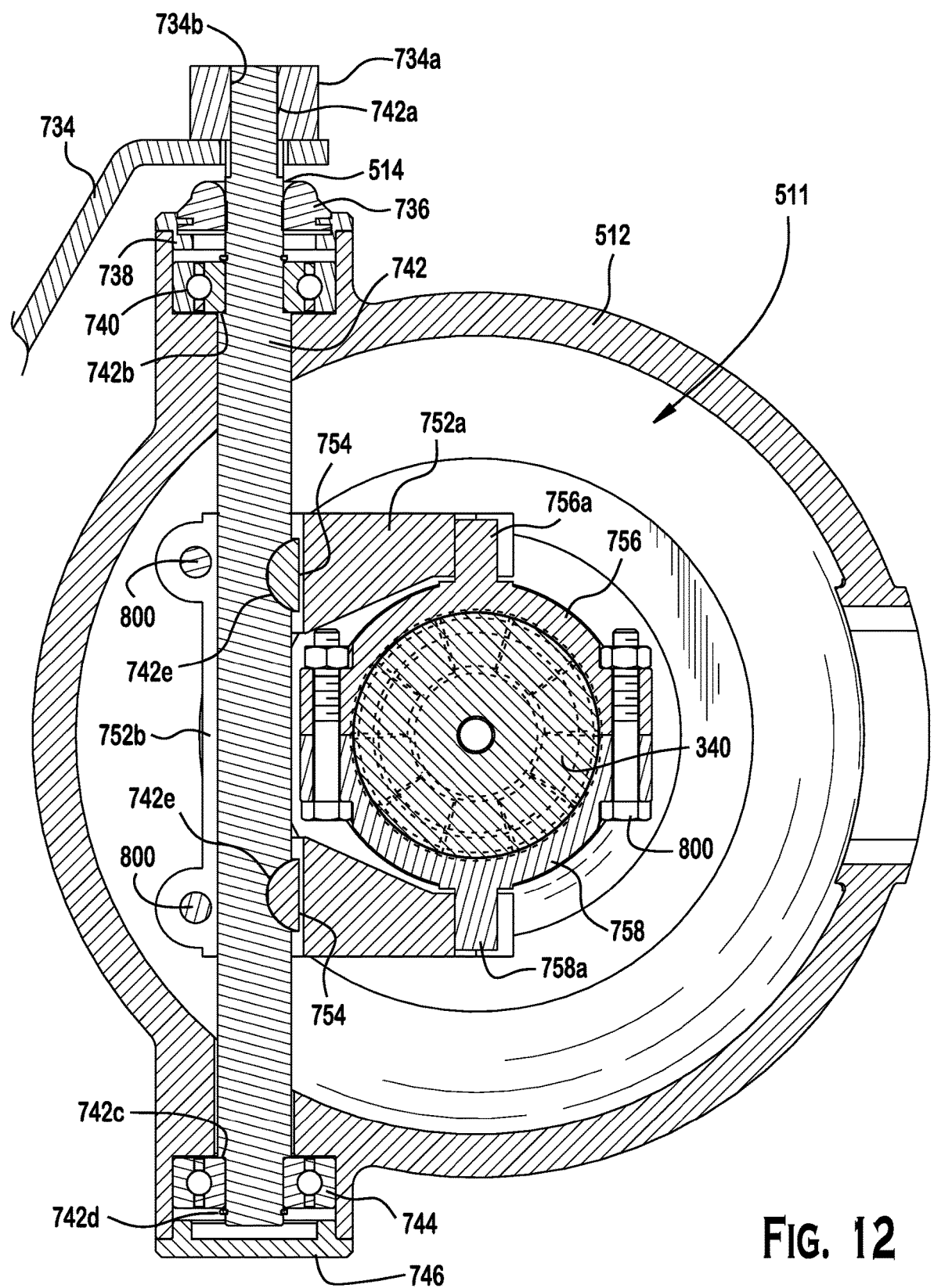
FIG. 12 is a sectional view of a lever assembly for the hydraulic drive system of FIG. 10.

As shown in FIGS. 10 and 12, the first engagement shaft 742 extends through the first shaft receiving passageway 514. The first engagement shaft spline 742a engages with the first engagement lever spline 734b such that motion of the first engagement lever 734 imparts motion to the first engagement shaft 742. The first lever seal 736 is disposed within the first lever upper snap ring 738 and positioned around the first engagement shaft 742 outside the first bell housing 510. The first lever upper bearing 740 is disposed around the first engagement shaft 742 and seated within the first shaft receiving passageway 514. The first lever upper bearing 740 also abuts the first engagement shaft upper surface 742b. The second end of the first engagement shaft 742 extends out of the first shaft receiving passageway 514. The first lever lower bearing 744 is disposed around the first engagement shaft 742 and is held on the first engagement shaft 742 by the first engagement shaft grommet 742d. The first lever lower bearing 744 is seated in the first shaft receiving passageway 514 and also abuts the first engagement shaft lower surface 742c. Due to the first lever upper bearing 740 and the first lever lower bearing 744, the first engagement shaft 742 is rotatable with respect to the first bell housing 510. The first lever lower snap ring 746 is disposed in the end of the first shaft receiving passageway 514 adjacent the second end of the first engagement shaft 742.

As shown in FIGS. 6, 10, 12, and 13, the first actuator pivot assembly 750 is attached to the first engagement shaft 742 within the first bell housing receiving space 511. The first yoke body 752b is disposed around the first engagement shaft 742 and secured by a plurality of fasteners 800. The plurality of first yoke keys 754 each engage one of the plurality of first engagement shaft keyways 742e, fixing the first yoke 752 with respect to the first engagement shaft 742. The first upper actuator collar protrusion 756a is rotatably connected to an end of one of the pair of first yoke arms 752a and the first lower actuator collar protrusion 758a is rotatably connected to an end of the other of the pair of first yoke arms 752a. The first upper actuator collar 756 and the first lower actuator collar 758 each engage the plurality of first motor actuator ridges 344 on a side of the first motor actuator 340, and a plurality of fasteners 800 connect the first upper actuator collar 756 to the first lower actuator collar 758, fixing the first motor actuator 340 between the first upper actuator collar 756 and the first lower actuator collar 758. The first motor actuator 340 is thus disposed within the first planetary gear drive 330 and also attached to the first actuator pivot assembly 750.

As shown in FIGS. 2, 19, 30 and 31, the plurality of second exterior lines 212 extend from outside the body housing 100 to the plurality of fluid line ports 130. The plurality of second wall connectors 216 are positioned in the plurality of fluid line ports 130 and connect the plurality of second exterior lines 212 with the third interior line 230 and the fourth interior line 232 positioned inside the body housing 100.

Figure 27:
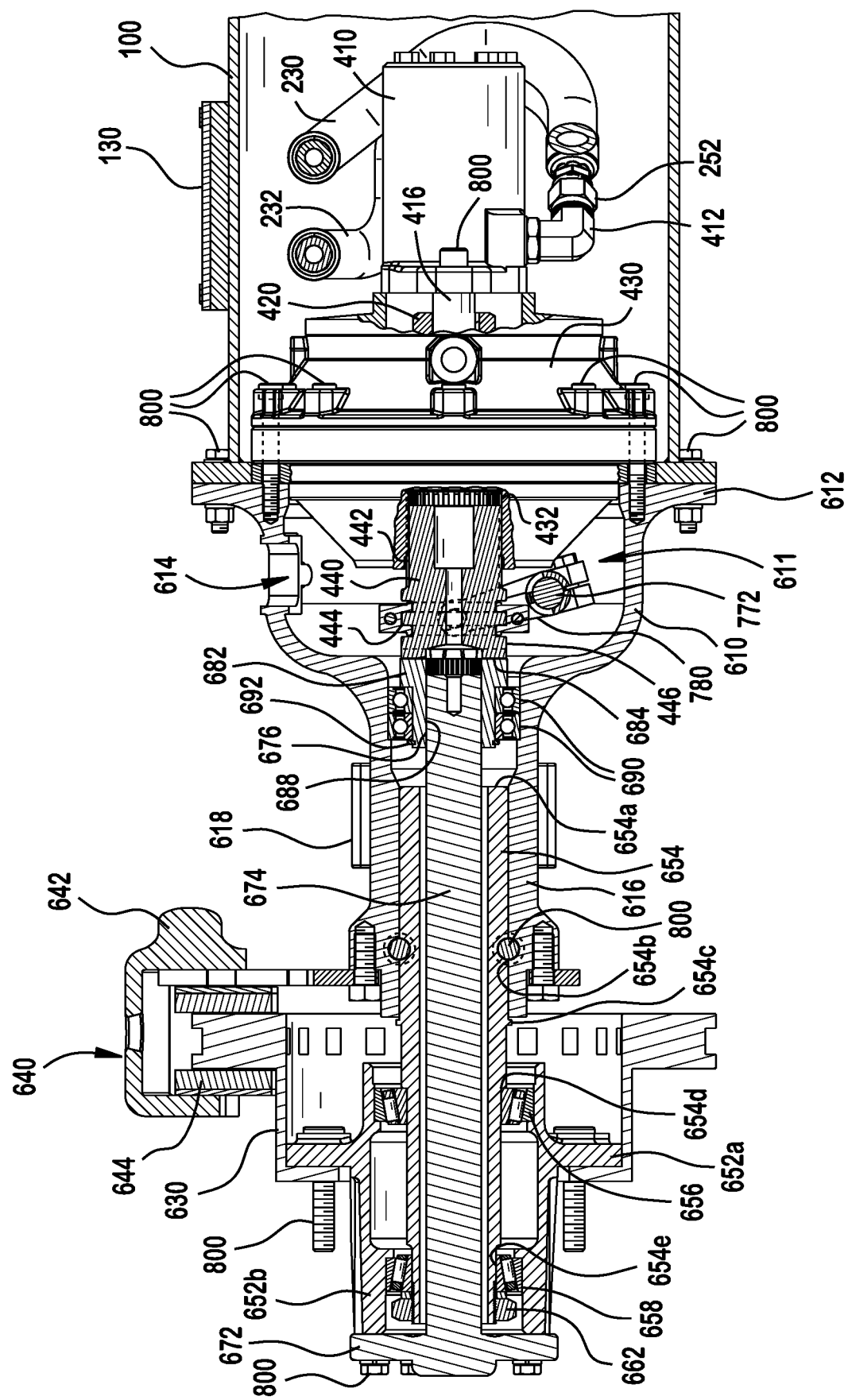
FIG. 27 is a partial sectional view of the hydraulic drive system of FIG. 1, showing one half thereof.

The second motor assembly 400, as shown in FIGS. 19-21, is positioned inside the body housing 100. As shown in FIGS. 19 and 20, the third interior coupling 250 connects the third interior line 230 to the second motor coupling 414, and the fourth interior coupling 252 connects the fourth interior line 232 to the second motor coupling 412. As shown in FIGS. 19, 21, and 27, a plurality of fasteners 800 attach the second motor 410 to a first side of the second planetary gear drive 430. The second motor shaft 416 extends into the second planetary gear drive 430, and is surrounded by the second motor adaptor 420, which permits the second motor 410 to engage with and operate the second planetary gear drive 430. The second motor actuator 440 is disposed in an opposite second side of the second planetary gear drive 430, with the second motor actuator mating spline 442 mating with the second planetary mating spline 432. Due to the mating of the second motor actuator mating spline 442 and the second planetary mating spline 432, the second motor actuator 440 is movable with respect to the second planetary gear drive 430 in a direction of the longitudinal axis of the second motor actuator 440.

As shown in FIGS. 20, 21 and 27, a plurality of fasteners 800 attach the second side of the second planetary gear drive 430 to the second bell housing flange 612. The second motor actuator 440 and a portion of the second planetary gear drive 430 are disposed in the second bell housing receiving space 611. The body housing 100, as shown in FIGS. 20 and 27, is also attached to the second bell housing flange 612 by a plurality of fasteners 800, with the body housing 100 positioned around the second planetary gear drive 430 and containing the second motor assembly 400.

The second rotor actuator 682 is disposed in the second bell housing receiving space 611, as shown in FIGS. 25 and 27, with the second rotor actuator teeth 684 facing the second motor actuator teeth 446. The plurality of second rotor actuator bearings 690 are secured to the second rotor actuator 682 by the second rotor actuator snap ring 692. The second rotor actuator 682 is secured to the second bell housing 610 within the second bell housing receiving space 611 by the plurality of second rotor actuator bearings 690, and the second rotor actuator 682 is rotatable within the plurality of second rotor actuator bearings 690 and with respect to the second bell housing 610.

The second hub assembly 650 is assembled with the second rotor assembly 600 as shown in FIGS. 24 and 27. The second spindle end 654a and the second spindle groove 654b are disposed within the second caster housing 616, with the second spindle ridge 654c abutting an end of the second caster housing 616. A plurality of fasteners 800 extend through the second caster housing 616, abutting the second caster housing 616 and disposed within each second spindle groove 654b to secure the second spindle 654 with respect to the second caster housing 616. The second outer spindle surface 654d and the second spindle securing end 654e are disposed outside of the second caster housing 616. The second inner hub bearing 656 is positioned around the second spindle 654 and abuts the second outer spindle surface 654d. The second hub housing base 652a is disposed around and abuts the second inner hub bearing 656. The second outer hub bearing 658 is positioned around the second spindle 654 adjacent the second end and is disposed between the second hub housing body 652b and the second spindle 654. The second outer hub bearing 658 is secured to the second spindle 654 by the second hub ring 660 and the second hub retainer 662 mating with the second spindle securing end 654e. Due to both the second inner hub bearing 656 and the second outer hub bearing 658 being disposed between the second hub housing 652 and the second spindle 654, the second hub housing 652 is rotatable with respect to the second spindle 654.

As shown in FIGS. 23 and 27, the second rotor 630 is attached to the second hub housing base 652a by a plurality of fasteners 800. The second rotor 630 is thus also rotatable with respect to the second spindle 654. The second brake 640 is disposed on the second rotor 630 with the second brake pads 644 adjacent the second rotor 630 on each side of the second rotor 630 and the second brake caliper 642 disposed around the second brake pads 644. A side of the second brake caliper 642 is attached at each end to the second brake mount 620. The second brake 640 is secured to the second caster housing 616 and the second rotor 630 can rotate within the second brake 640.

The second drive shaft flange 672 is attached to the second hub housing body 652b by a plurality of fasteners 800, as shown in FIGS. 23 and 27, and the second drive shaft body 674 extends through the second spindle 654. The second drive shaft spline 676 mates with the second rotor actuator spline 688 such that the second drive shaft 670, the second hub housing 652, and the second rotor 630 rotate with the second rotor actuator 682.

An opposite second end of the second pivot arm 724, as shown in FIG. 2, is pivotably attached to the second pivot rod 762 which extends outside of the body housing 100 from the second pivot arm 724 to the second engagement lever 764. The second pivot rod 762 is attached to an end of the second engagement lever 764 opposite the second engagement lever protrusion 764a. The second engagement lever 764 is disposed on the second bell housing 610 with the second engagement lever protrusion 764a disposed over the second shaft receiving passageway 614.

Figure 28:
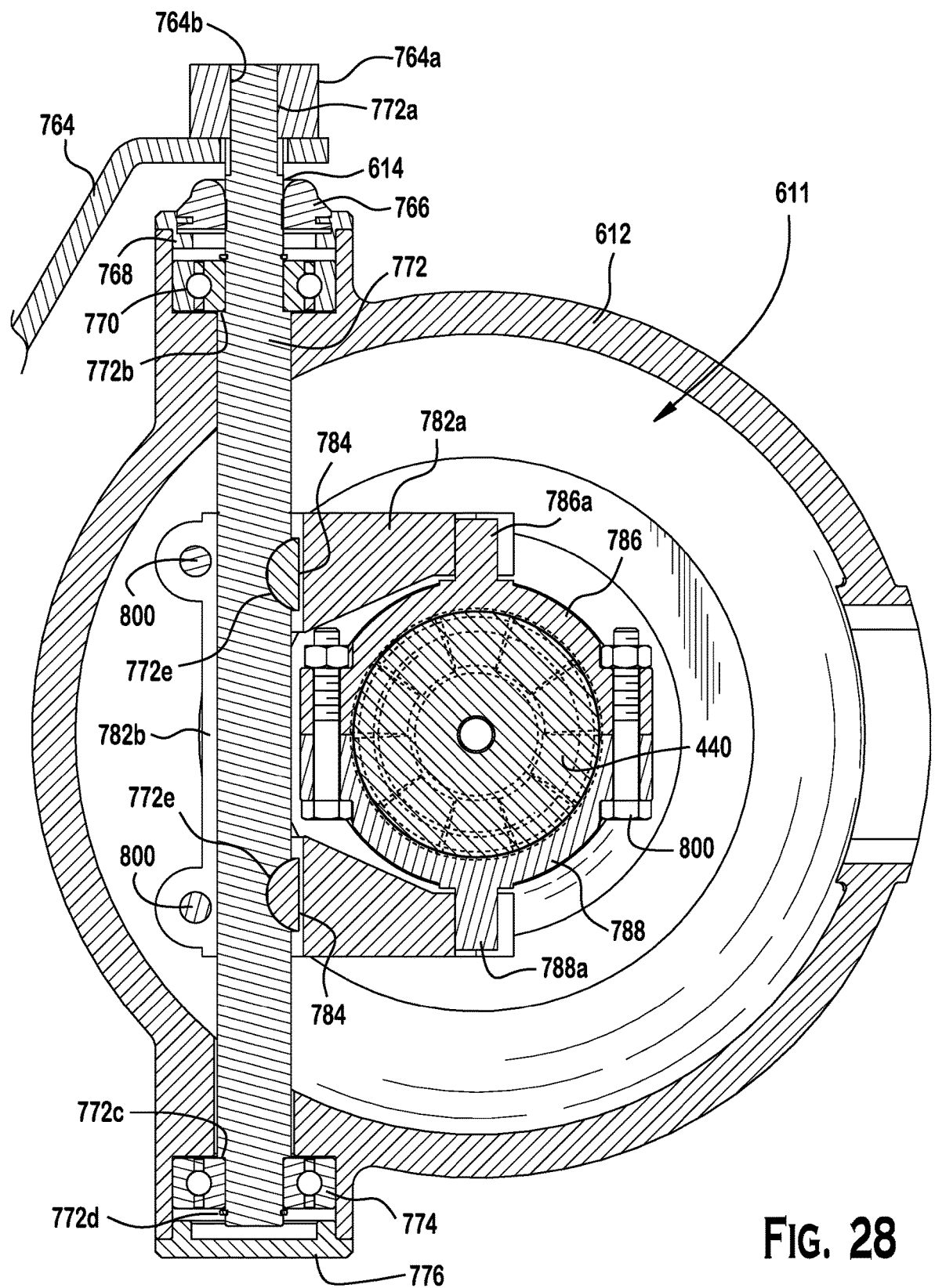
FIG. 28 is a sectional view of a lever assembly for the hydraulic drive system of FIG. 26.

As shown in FIGS. 26 and 28, the second engagement shaft 772 extends through the second shaft receiving passageway 614. The second engagement shaft spline 772a engages with the second engagement lever spline 764b such that motion of the second engagement lever 764 imparts motion to the second engagement shaft 772. The second lever seal 766 is disposed within the second lever upper snap ring 768 and positioned around the second engagement shaft 772 outside the second bell housing 610. The second lever upper bearing 770 is disposed around the second engagement shaft 772 and seated within the second shaft receiving passageway 614. The second lever upper bearing 770 also abuts the second engagement shaft upper surface 772b. The second end of the second engagement shaft 772 extends out of the second shaft receiving passageway 614. The second lever lower bearing 774 is disposed around the second engagement shaft 772 and is held on the second engagement shaft 772 by the second engagement shaft grommet 772d. The second lever lower bearing 774 is seated in the second shaft receiving passageway 614 and also abuts the second engagement shaft lower surface 772c. Due to the second lever upper bearing 770 and the second lever lower bearing 774, the second engagement shaft 772 is rotatable with respect to the second bell housing 610. The second lever lower snap ring 776 is disposed in the end of the second shaft receiving passageway 614 adjacent the second end of the second engagement shaft 772.

As shown in FIGS. 22, 26, 28, and 29, the second actuator pivot assembly 780 is attached to the second engagement shaft 772 within the second bell housing receiving space 611. The second yoke body 782b is disposed around the second engagement shaft 772 and secured by a plurality of fasteners 800. The plurality of second yoke keys 784 each engage one of the plurality of second engagement shaft keyways 772e, fixing the second yoke 782 with respect to the second engagement shaft 772. The second upper actuator collar protrusion 786a is rotatably connected to an end of one of the pair of second yoke arms 782a and the second lower actuator collar protrusion 788a is rotatably connected to an end of the other of the pair of second yoke arms 782a. The second upper actuator collar 786 and the second lower actuator collar 788 each engage the plurality of second motor actuator ridges 444 on a side of the second motor actuator 440, and a plurality of fasteners 800 connect the second upper actuator collar 786 to the second lower actuator collar 788, fixing the second motor actuator 440 between the second upper actuator collar 786 and the second lower actuator collar 788. The second motor actuator 440 is thus disposed within the second planetary gear drive 430 and also attached to the second actuator pivot assembly 780.

An exemplary assembly of a hydraulic drive system 1 according to the invention with trailer 900 will now be described in greater detail with reference to FIG. 1.

The frame 910 is a rigid structure formed from a plurality of beams 914. The frame 910 has a hitch 912 disposed at a first end. The hitch 912 includes a connector, for example, a ball mount, for connecting the frame 910 with a towing device (not shown). The pair of steerable wheels 950 are both positioned under and pivotably attached to the frame 910 adjacent the first end.

The hydraulic drive system 1 is attached to an underside of the frame 910 adjacent an opposite second end of the frame 910. The hydraulic drive system 1 extends orthogonally with respect to a longitudinal axis of the frame 910. Each of the pair of drive wheels 940 is attached to one of the first rotor 530 and the second rotor 630. The pair of drive wheels 940 and the pair of steerable wheels 950 together support the frame 910 and components attached to the frame 910.

The fluid supply system 920 supplies hydraulic fluid to the hydraulic drive system 1. The fluid supply system 920 has a pump 922 and a fluid reservoir 924 each attached to the frame 910. The fluid reservoir 924 stores hydraulic fluid. The pump 922 is connected to the plurality of first exterior lines 210 and the plurality of second exterior lines 212 and pumps hydraulic fluid from the fluid reservoir 924 through the fluid line assembly 200. The pump 922 is capable of pumping hydraulic fluid through the fluid line assembly 200 in either a first direction or an opposite second direction.

The engagement mechanism 930 is attached to an underside of the frame 910. The engagement mechanism 930 is connected to the hitch 912 at a first end and the main shaft 710 at an opposite second end. The engagement mechanism 930 moves the main shaft 710 in a longitudinal direction of the main shaft 710 based on whether the hitch 912 is attached to the towing device.

The use of the hydraulic drive system 1 within the exemplary trailer 900 will now be described in greater detail with reference to FIGS. 1, 3, 11, and 13-18. The hydraulic drive system 1 is used to drive the pair of drive wheels 940 to more precisely locate the trailer 900 when the trailer 900 is not being towed.

Figure 16:
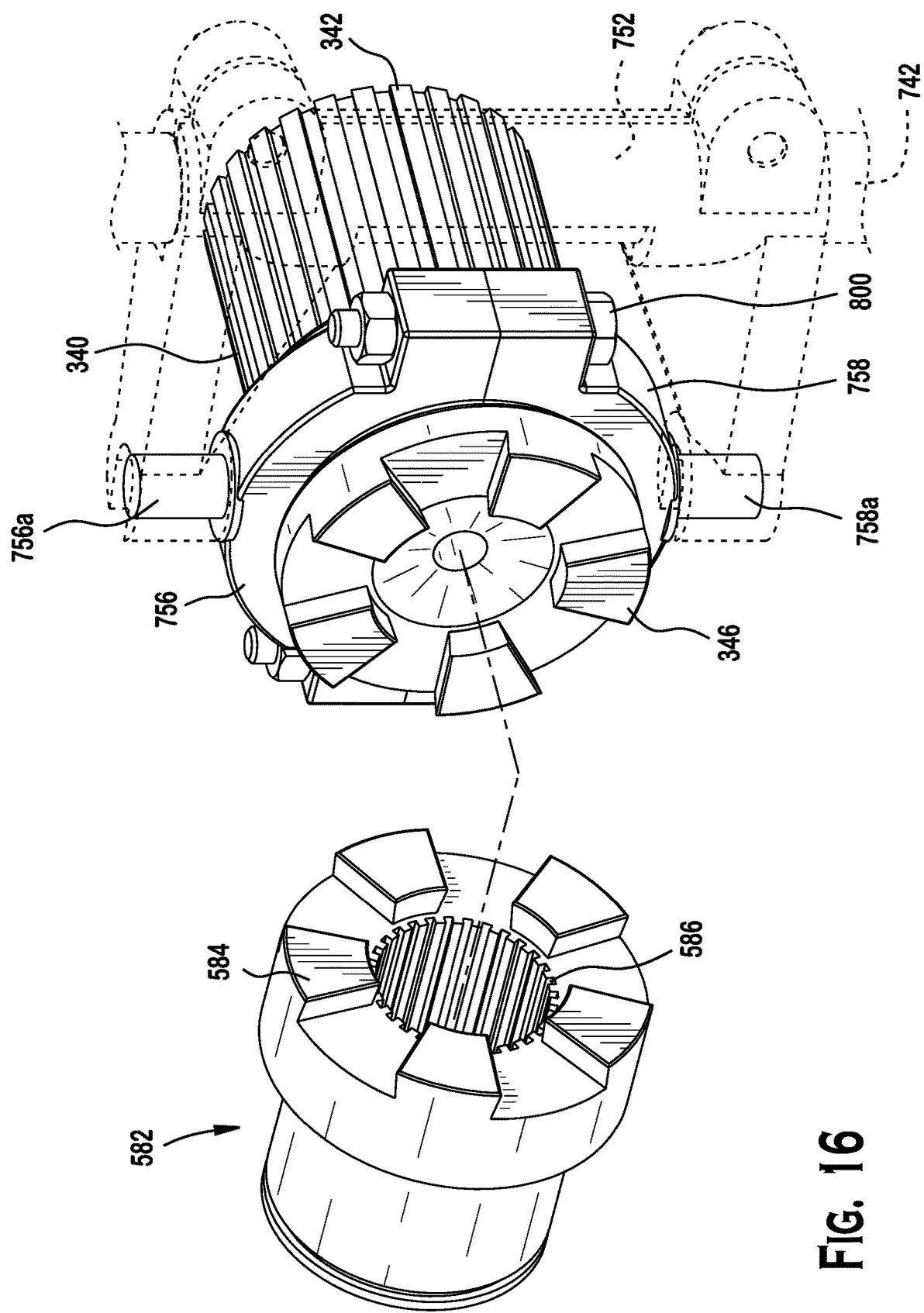
FIG. 16 is a perspective view of a rotor actuator and a motor actuator of the hydraulic drive system of FIG. 1.
Figure 17:
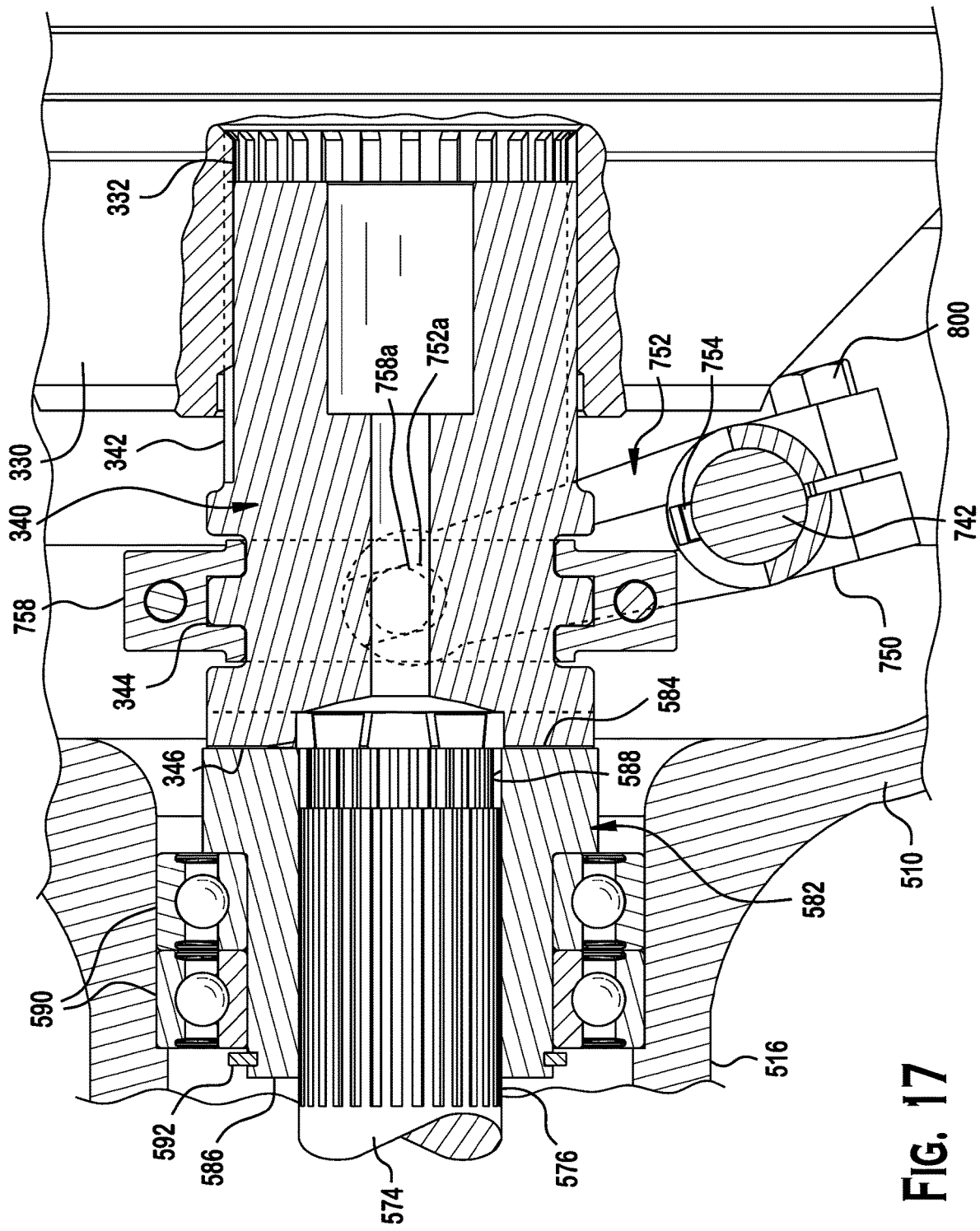
FIG. 17 is a sectional view of the hydraulic drive system of FIG. 1 in the engagement position.
Figure 18:
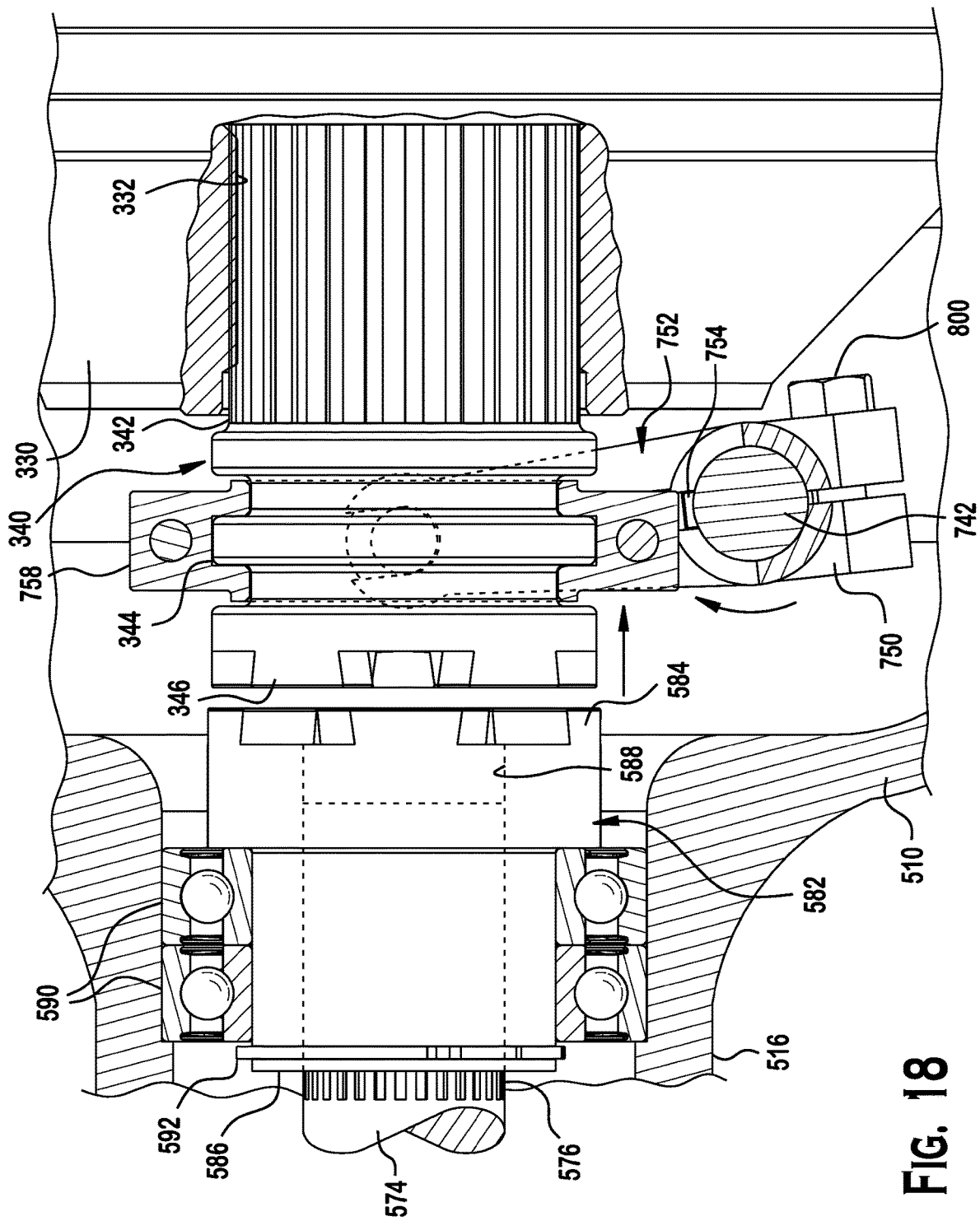
FIG. 18 is a sectional view of the hydraulic drive system of FIG. 1 in the disengagement position.
Figure 32:
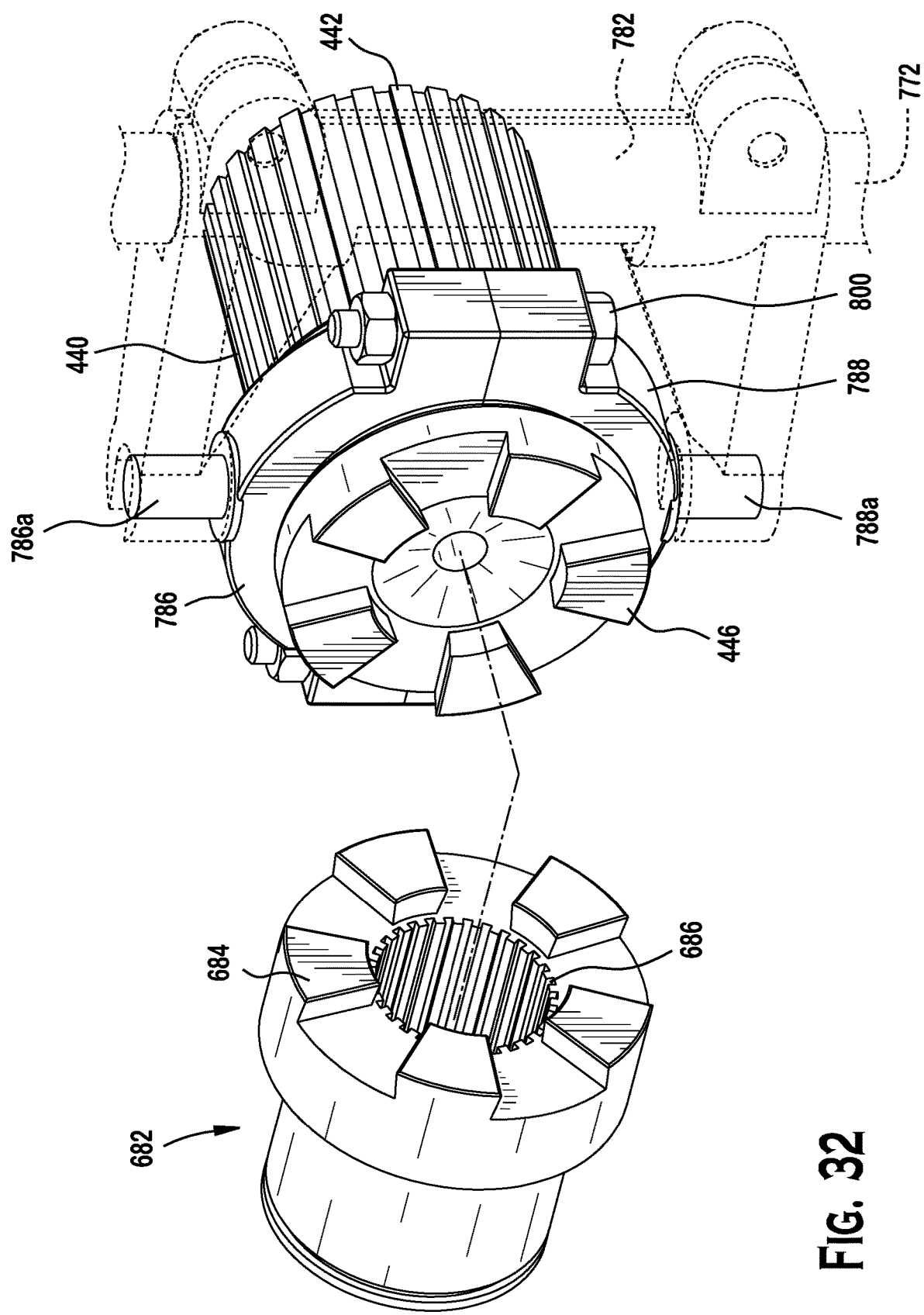
FIG. 32 is a perspective view of a rotor actuator and a motor actuator of the hydraulic drive system of FIG. 1.
Figure 33:
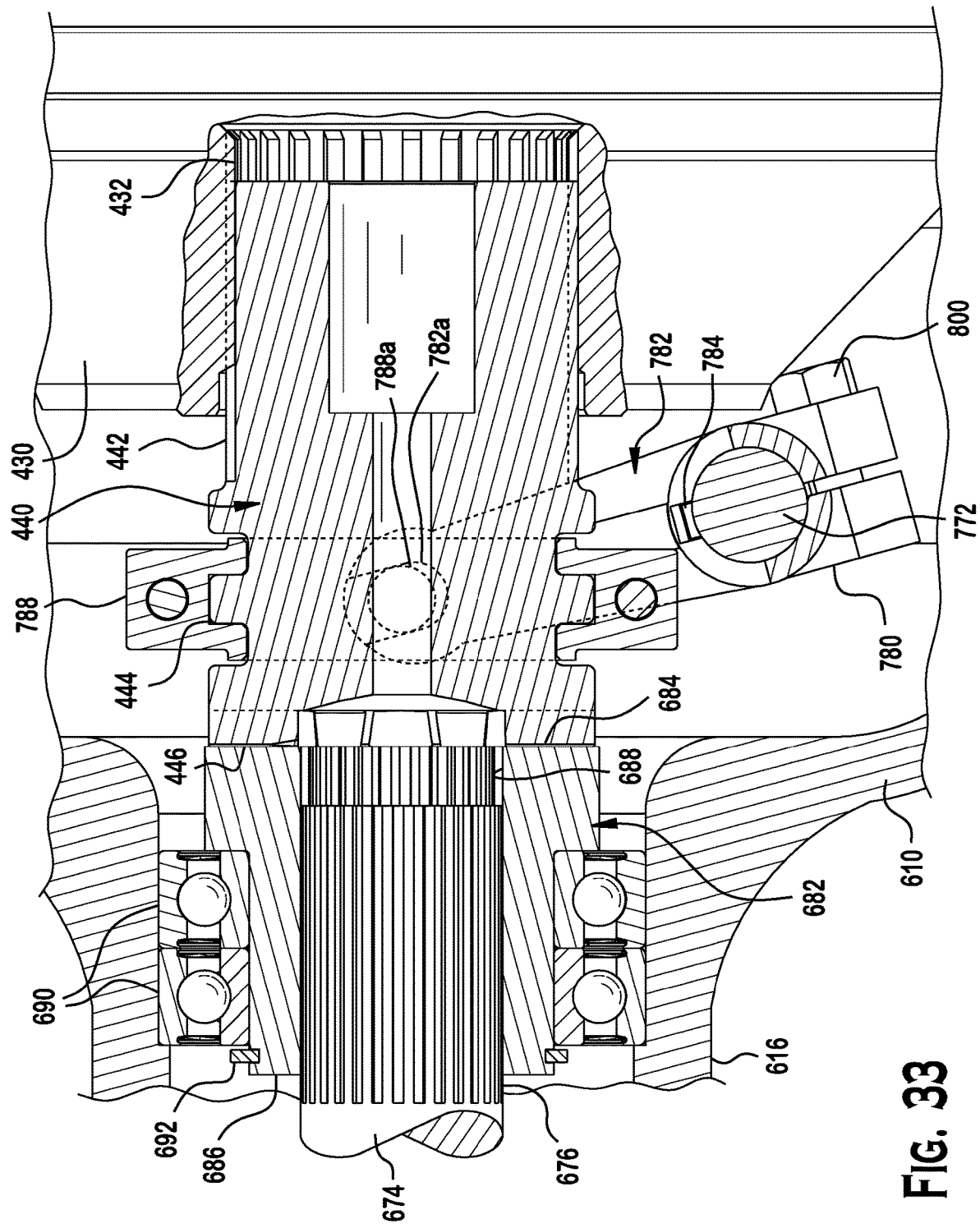
FIG. 33 is a sectional view of the hydraulic drive system of FIG. 1 in the engagement position.
Figure 34:
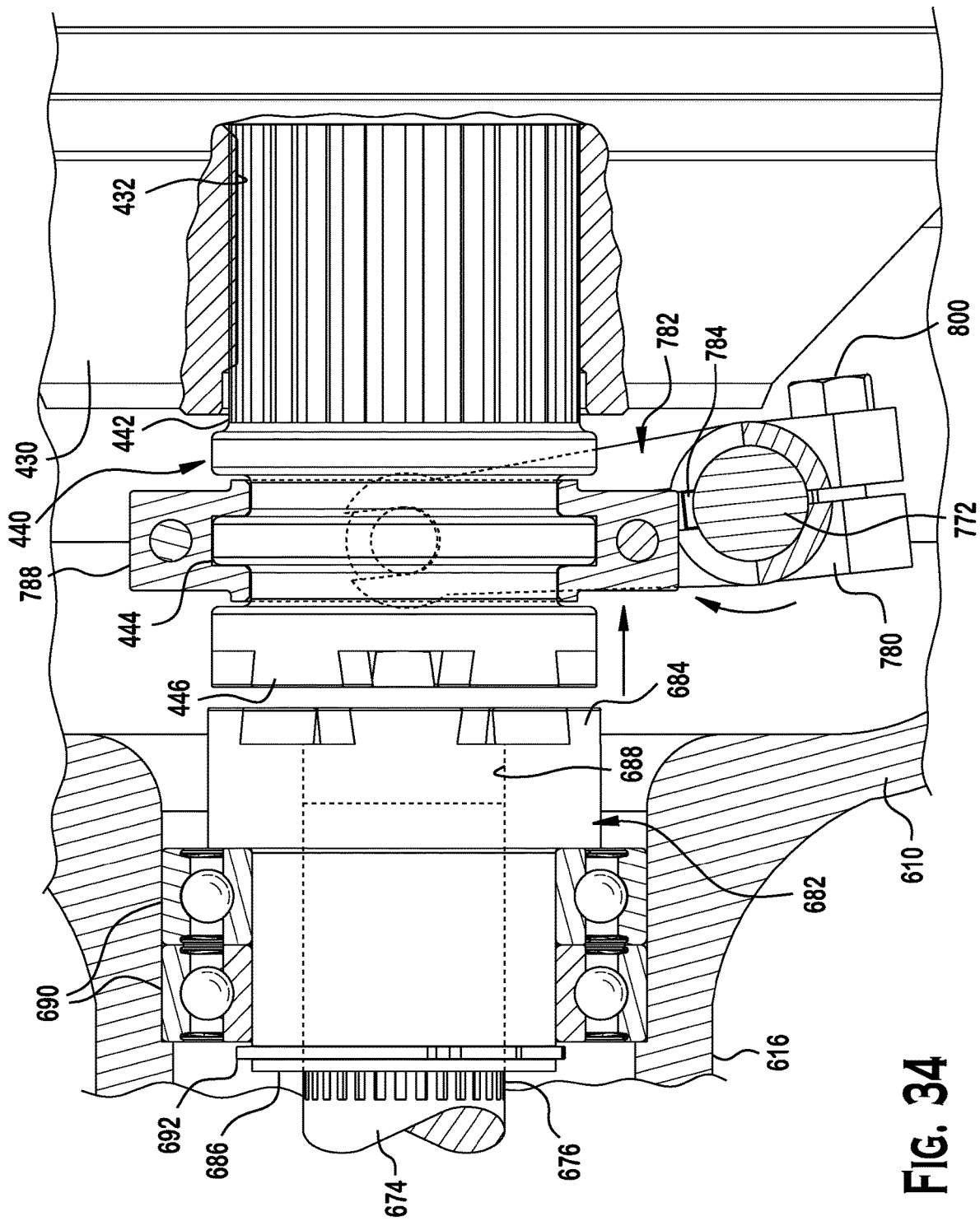
FIG. 34 is a sectional view of the hydraulic drive system of FIG. 1 in the disengagement position.

The plurality of first motor actuator teeth 346, as shown in FIGS. 16-18, are matable with the plurality of first rotor actuator teeth 584. The plurality of second motor actuator teeth 446, as shown in FIGS. 32-34, are matable with the plurality of second rotor actuator teeth 684. The engagement assembly 700, as described in greater detail below, moves the first motor actuator 340 with respect to the first rotor actuator 582 between an engagement position in which the first motor actuator 340 mates with and engages the first rotor actuator 582 and a disengagement position in which the first motor actuator 340 and the first rotor actuator 582 are separated. The engagement assembly 700 likewise moves the second motor actuator 440 with respect to the second rotor actuator 682 between the engagement position in which the second motor actuator 440 mates with and engages the second rotor actuator 682 and the disengagement position in which the second motor actuator 440 and the second rotor actuator 682 are separated.

Figure 14:
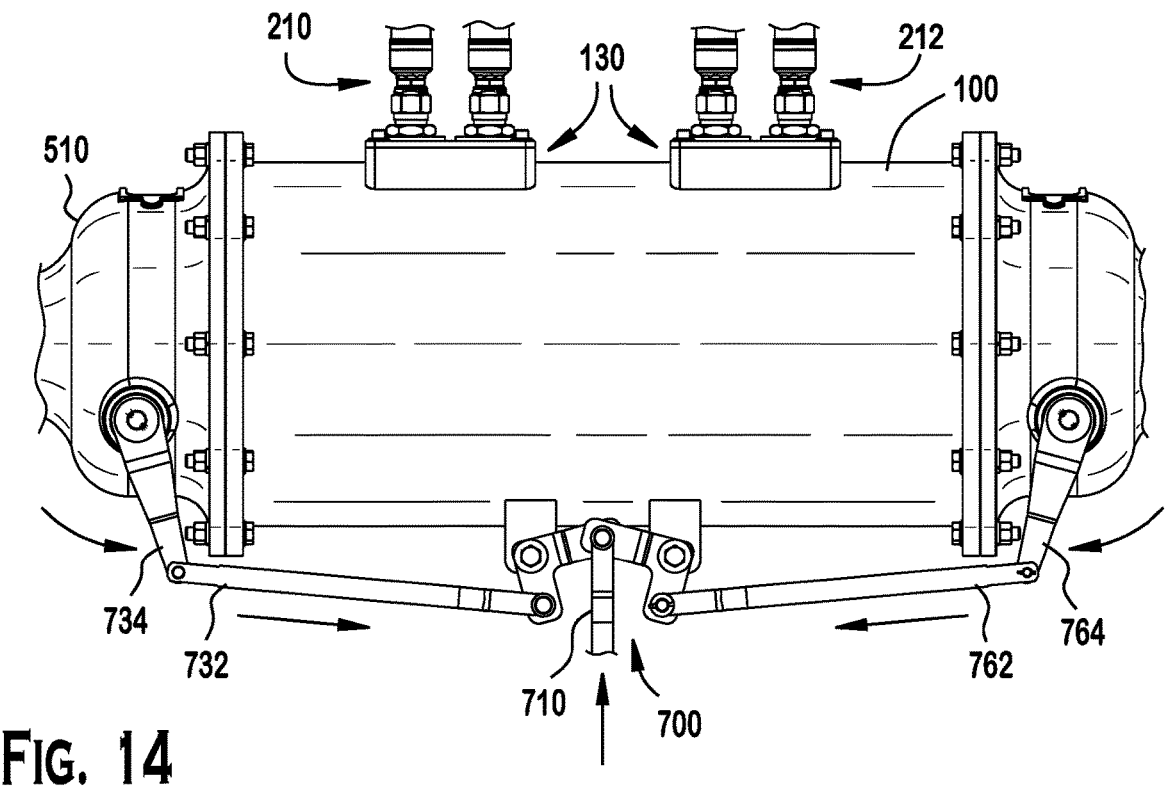
FIG. 14 is top plan view of the hydraulic drive system of FIG. 1 in an engagement position.

The engagement position of the hydraulic drive system 1 is shown in FIGS. 14 and 17. As shown in FIGS. 1 and 14, when the hitch 912 is not attached to the towing device, the engagement mechanism 930 does not affect the main shaft 710, and the main shaft 710 is positioned closer to the body housing 100.

Figure 13:
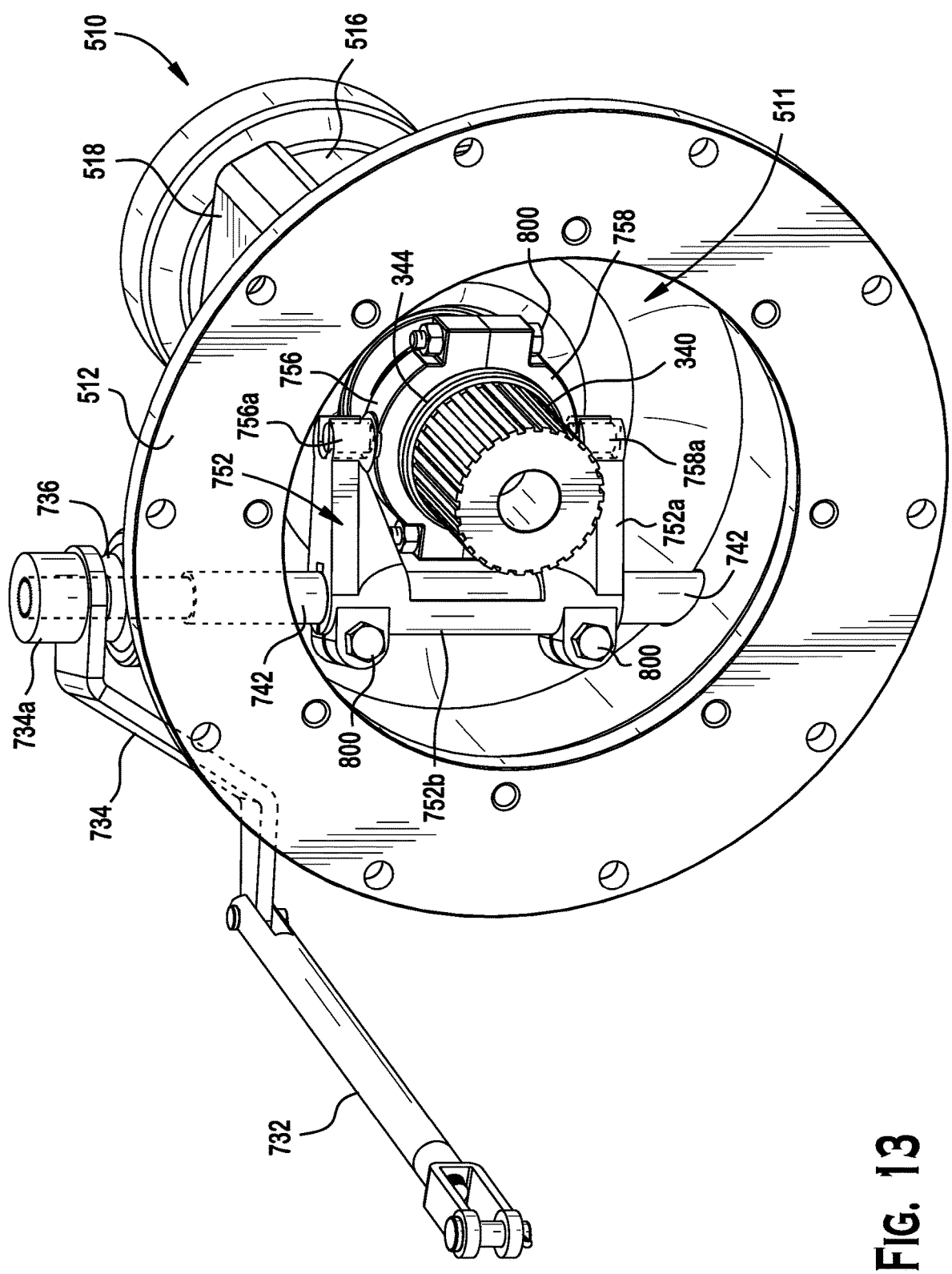
FIG. 13 is a perspective view of the lever assembly for the hydraulic drive system of FIG. 10.

In the engagement position, the first pivot rod 732 is positioned closer to the main shaft 710, pulling the first engagement lever 734 toward the housing body 100. As the first engagement lever 734 is pulled toward the housing body 100, as shown in FIGS. 13 and 17, the first yoke 752 turns with the first engagement shaft 742 and moves the first motor actuator 340 toward the first rotor actuator 582 in a longitudinal direction of the first motor actuator 340. As shown in FIG. 17, the first motor actuator 340 is moved until the plurality of first motor actuator teeth 346 engage with the plurality of first rotor actuator teeth 584. A portion of the first motor actuator 340 remains within the first planetary gear drive 330 as the first motor actuator mating spline 342 slides along the first planetary mating spline 332 during motion of the first motor actuator 340.

The hydraulic drive system 1 only provides motive power to the pair of drive wheels 940 in the engagement position in which the plurality of first motor actuator teeth 346 are engaged with the plurality of first rotor actuator teeth 584. In the engagement position, rotation of the first motor actuator 340 imparts rotation to the first rotor actuator 582. The pump 922 pumps hydraulic fluid from the fluid reservoir 924 through the plurality of first exterior lines 210 and through each of the first interior line 220 and the second interior line 222, as shown in FIGS. 3 and 14. Depending on the direction of fluid flow created by the pump 922, one of the first interior line 220 and the second interior line 222 is an input line, and the other of the first interior line 220 and the second interior line 222 is an output line.

The first interior line 220 and the second interior line 222 transmit hydraulic fluid to operate the first motor 310, which operates the first planetary gear drive 330. Rotation of the first planetary gear drive 330 rotates the first motor actuator 340 via the interaction of the first planetary mating spline 332 and the first motor actuator mating spline 342. In the engagement position shown in FIG. 17, rotation of the first motor actuator 340 imparts rotation to the first rotor actuator 582. As shown in FIG. 11, rotation of the first rotor actuator 582 rotates the first drive shaft 570 via the interaction of the first rotor actuator spline 588 and the first drive shaft spline 576. The first drive shaft 570 is fixed to the first hub housing 552 and the first hub housing 552 is fixed to the first rotor 530, and consequently, rotation of the first drive shaft 570 imparts rotation to the first rotor 530, providing motive power to one of the pair of drive wheels 940. If, for example, the first interior line 220 is the input line, the first motor 310 imparts a rotation that turns the drive wheel 940 in a clockwise direction, and if the first interior line 220 is the output line, the first motor 310 imparts a rotation that turns the drive wheel 940 in a counterclockwise direction.

Figure 29:
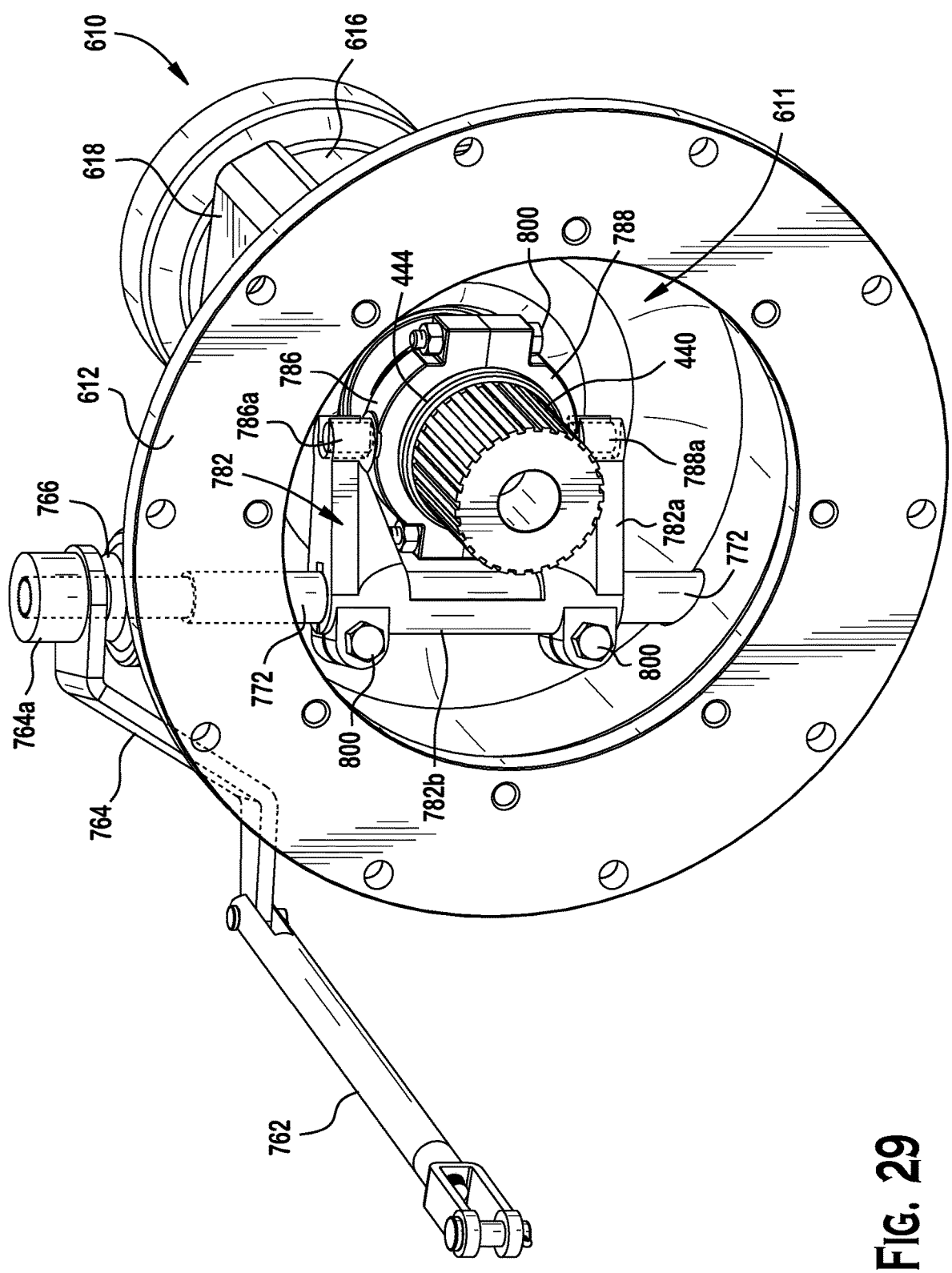
FIG. 29 is a perspective view of the lever assembly for the hydraulic drive system of FIG. 26.
Figure 30:
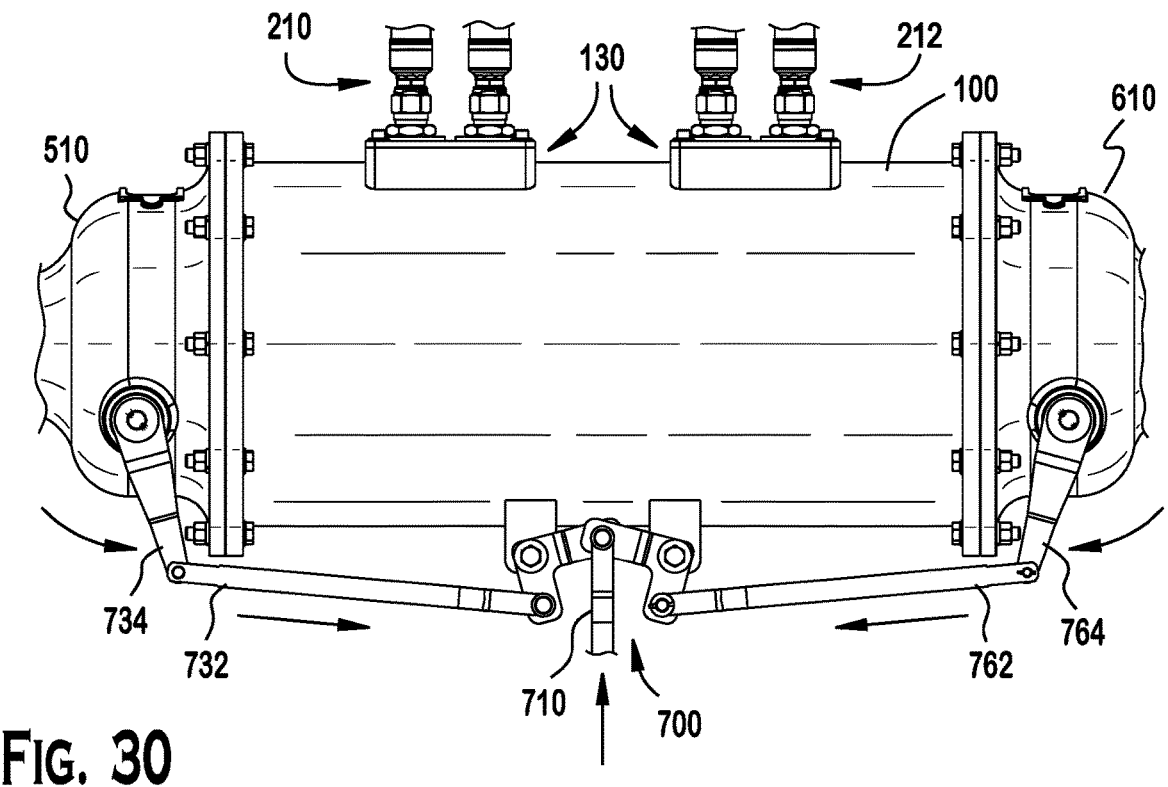
FIG. 30 is top plan view of the hydraulic drive system of FIG. 1 in an engagement position.

A similar engagement occurs on the symmetrical other side of the hydraulic drive system 1. In the engagement position, as shown in FIGS. 14 and 30, the second pivot rod 762 is positioned closer to the main shaft 710, pulling the second engagement lever 764 toward the housing body 100. As the second engagement lever 764 is pulled toward the housing body 100, as shown in FIGS. 29 and 33, the second yoke 782 turns with the second engagement shaft 772 and moves the second motor actuator 440 toward the second rotor actuator 682 in a longitudinal direction of the second motor actuator 440. The second motor actuator 440 is moved until the plurality of second motor actuator teeth 446 engage with the plurality of second rotor actuator teeth 684. A portion of the second motor actuator 440 remains within the second planetary gear drive 430 as the second motor actuator mating spline 442 slides along the second planetary mating spline 432 during motion of the second motor actuator 440.

The hydraulic drive system 1 only provides motive power to the pair of drive wheels 940 in the engagement position in which the plurality of second motor actuator teeth 446 are engaged with the plurality of second rotor actuator teeth 684. In the engagement position, rotation of the second motor actuator 440 imparts rotation to the second rotor actuator 682. The pump 922 pumps hydraulic fluid from the fluid reservoir 924 through the plurality of second exterior lines 212 and through each of the third interior line 230 and the fourth interior line 232, as shown in FIGS. 19 and 30. Depending on the direction of fluid flow created by the pump 922, one of the third interior line 230 and the fourth interior line 232 is an input line, and the other of the third interior line 230 and the fourth interior line 232 is an output line.

The third interior line 230 and the fourth interior line 232 provide hydraulic fluid to operate the second motor 410, which operates the second planetary gear drive 430. Rotation of the second planetary gear drive 430 rotates the second motor actuator 440 via the interaction of the second planetary mating spline 432 and the second motor actuator mating spline 442. In the engagement position shown in FIG. 33, rotation of the second motor actuator 440 imparts rotation to the second rotor actuator 682. As shown in FIG. 27, rotation of the second rotor actuator 682 rotates the second drive shaft 670 via the interaction of the second rotor actuator spline 688 and the second drive shaft spline 676. The second drive shaft 670 is fixed to the second hub housing 652 and the second hub housing 652 is fixed to the second rotor 630, and consequently, rotation of the second drive shaft 670 imparts rotation to the second rotor 630, providing motive power to one of the pair of drive wheels 940. If, for example, the third interior line 230 is the input line, the second motor 410 imparts a rotation that turns the drive wheel 940 in a clockwise direction, and if the third interior line 230 is the output line, the second motor 410 imparts a rotation that turns the drive wheel 940 in a counterclockwise direction.

Consequently, when the trailer 900 is not attached to the towing device, the engagement assembly 700 automatically moves to the engagement position in which rotation of either the first motor 310 or the second motor 410 imparts rotation to the pair of drive wheels 940, allowing the hydraulic drive system 1 to drive the trailer 900.

Figure 15:
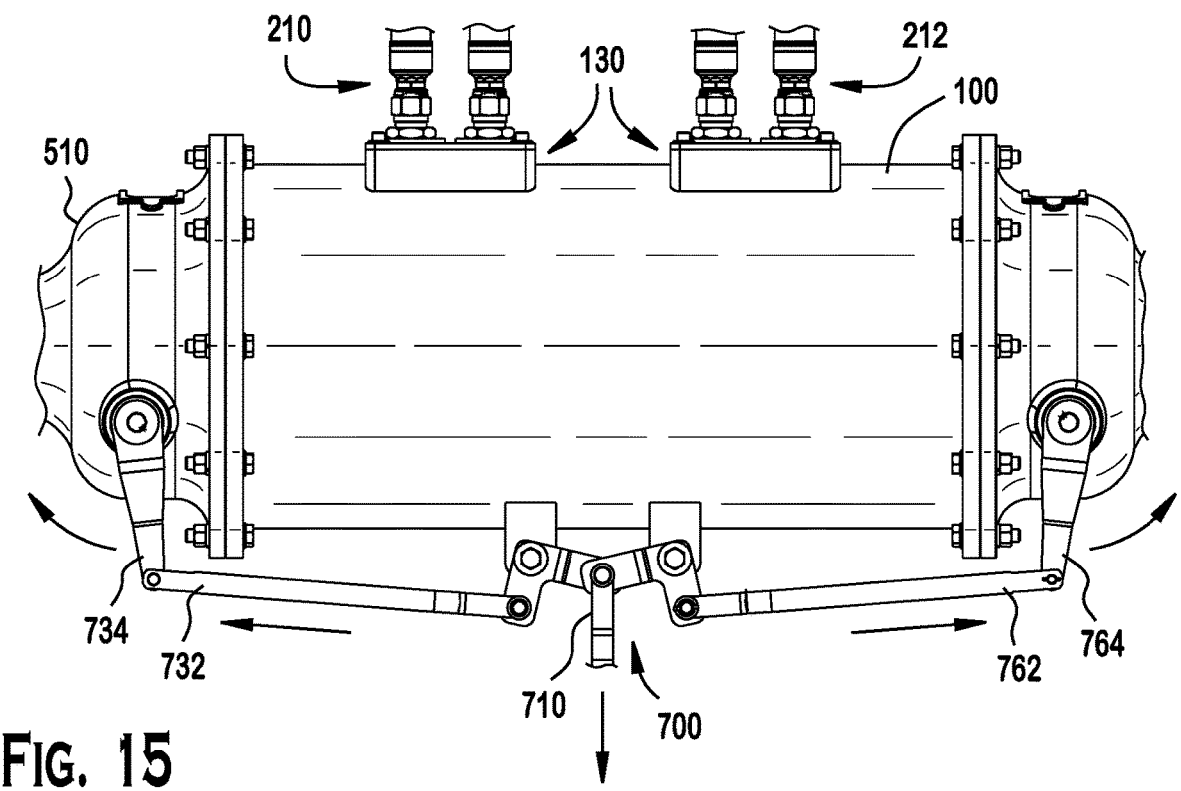
FIG. 15 is a top plan view of the hydraulic drive system of FIG. 1 in a disengagement position.

The disengagement position of the hydraulic drive system 1 is shown in FIGS. 15 and 18. As shown in FIG. 15, when the hitch 912 is attached to the towing device, the engagement mechanism 930 pulls the main shaft 710 in a direction away from the body housing 100 along the longitudinal axis of the main shaft 710.

When the main shaft 710 is positioned further from the body housing 100, the first pivot rod 732 is positioned further from the main shaft 710, pushing the first engagement lever 734 in a direction away from the housing body 100. As the first engagement lever 734 is pushed away from the housing body 100, as shown in FIGS. 13 and 18, the first yoke 752 turns with the first engagement shaft 742 and moves the first motor actuator 340 away from the first rotor actuator 582 in the longitudinal direction of the first motor actuator 340. As shown in FIG. 18, the first motor actuator 340 is moved until the plurality of first motor actuator teeth 346 disengage from the plurality of first rotor actuator teeth 584. In the disengagement position, the plurality of first motor actuator teeth 346 are separated from and face the plurality of first rotor actuator teeth 584.

Figure 31:
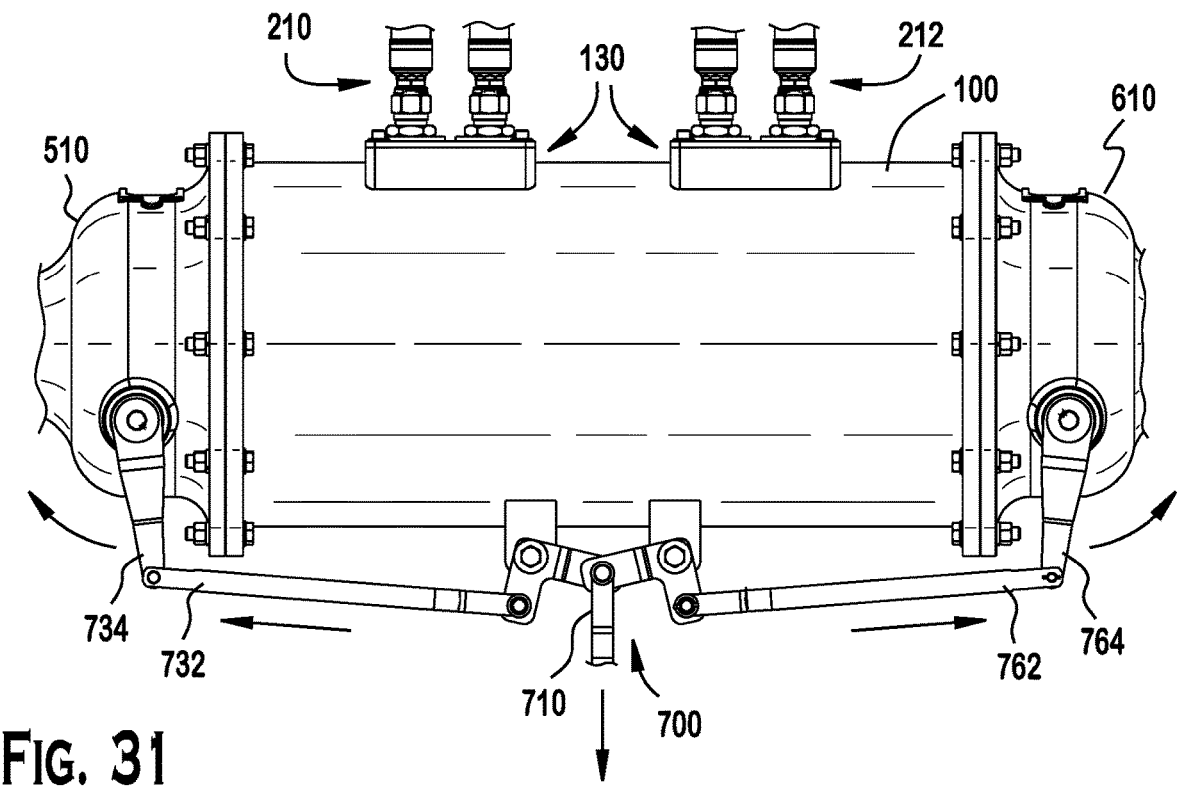
FIG. 31 is a top plan view of the hydraulic drive system of FIG. 1 in a disengagement position.

A similar disengagement occurs on the symmetrical other side of the hydraulic drive system 1. As shown in FIGS. 15, 31, and 34 when the main shaft 710 is positioned further from the body housing 100, the second pivot rod 762 is positioned further from the main shaft 710, pushing the second engagement lever 764 in a direction away from the housing body 100. As the second engagement lever 764 is pushed away from the housing body 100, the second yoke 782 turns with the second engagement shaft 772 and moves the second motor actuator 440 away from the second rotor actuator 682 in the longitudinal direction of the second motor actuator 440 until the plurality of second motor actuator teeth 446 disengage from the plurality of second rotor actuator teeth 684. In the disengagement position, the plurality of second motor actuator teeth 446 are separated from and face the plurality of second rotor actuator teeth 684.

Consequently, when the trailer 900 is attached to the towing device, the engagement assembly 700 automatically moves to the disengagement position in which rotation of either the first motor 310 or the second motor 410 does not impart rotation to any portion of the first or second rotor assemblies 500, 600. The pair of drive wheels 940 thus roll freely without impairment from the first motor 310 or the second motor 410 when the hydraulic drive system 1 is not needed to drive the pair of drive wheels 940.

The foregoing illustrates some of the possibilities for practicing the invention. Many other embodiments are possible within the scope and spirit of the invention. The disclosed invention utilizes the above identified components, as a system, in order to more efficiently construct a hydraulic drive system 1 for a particular purpose. Therefore, more or less of the aforementioned components can be used to conform to that particular purpose. It is, therefore, intended that the foregoing description be regarded as illustrative rather than limiting, and that the scope of the invention is given by the appended claims together with their full range of equivalents.

What is claimed is:

1. A hydraulic drive system, comprising:
   a body housing;
   a first rotor assembly attached to a first side of the body housing;
   a first motor assembly disposed inside the body housing and having a first movable motor actuator connected and rotatable by a first hydraulic motor;
   a second rotor assembly attached to a second side of the body housing opposite the first rotor assembly;
   a second motor assembly positioned apart from the first motor assembly and disposed inside the body housing on an opposite end from the first motor assembly and having a second movable motor actuator rotatable by a second hydraulic motor; and
   an engagement assembly moving the first movable motor actuator toward and away from the first rotor assembly to respectively engage and disengage therewith and moving the second movable motor actuator toward and away from the second rotor assembly to respectively engage and disengage therewith.

2. The hydraulic drive system of claim 1, wherein the first movable motor actuator engages a first rotor actuator of the first rotor assembly.

3. The hydraulic drive system of claim 2, wherein the first movable motor actuator includes a plurality of motor actuator teeth disposed on an end thereof.

4. The hydraulic drive system of claim 3, wherein the first rotor actuator includes a plurality of rotor actuator teeth disposed on an end.

5. The hydraulic drive system of claim 4, wherein the plurality of motor actuator teeth correspond with and separated from the plurality of rotor actuator teeth when positioned in a disengagement position by the engagement assembly.

6. The hydraulic drive system of claim 5, wherein the plurality of motor actuator teeth correspond with and engage the plurality of rotor actuator teeth when positioned in an engagement position by the engagement assembly.

7. The hydraulic drive system of claim 1, wherein the first hydraulic motor is connected to a planetary gear drive by a motor shaft extends from the hydraulic motor and into the planetary gear drive.

8. The hydraulic drive system of claim 7, wherein the hydraulic motor operates the planetary gear drive.

9. The hydraulic drive system of claim 8, wherein the first movable motor actuator is positioned on an opposite side of the planetary gear drive with respect to the hydraulic motor.

10. The hydraulic drive system of claim 9, wherein the first rotor actuator is positioned in a bell housing of the first rotor assembly.

11. The hydraulic drive system of claim 10, wherein the first rotor actuator includes a rotor actuator spline engaged with a drive shaft of the first rotor assembly such that rotation of the first rotor actuator imparts rotation to the drive shaft.

12. The hydraulic drive system of claim 11, wherein the drive shaft is secured to a hub housing fixed to a rotor of the first rotor assembly.

13. The hydraulic drive system of claim 12, wherein the engagement assembly extends through the bell housing.

14. The hydraulic drive system of claim 13, wherein the engagement assembly includes a main shaft and a first engagement shaft that turns with motion of the main shaft.

15. The hydraulic drive system of claim 14, wherein the engagement assembly includes a yoke fixed to the first engagement shaft and connects to the first movable motor actuator.

16. The hydraulic drive system of claim 15, wherein the main shaft moves the first movable motor actuator between the engagement position and the disengagement position.

17. The hydraulic drive system of claim 16, wherein the main shaft extends outside of the body housing.

18. The hydraulic drive system of claim 14, wherein the engagement assembly has a second engagement shaft that turns with motion of the main shaft.

19. The hydraulic drive system of claim 18, wherein motion of the main shaft moves the second motor actuator between an engagement position and a disengagement position.

20. A hydraulic drive system, comprising:
a first hydraulic drive assembly having:
- a first rotor assembly having a first hub assembly, a first drive shaft connected to the first hub assembly, and a first rotor actuator assembly with a first rotor actuator connected to the first drive shaft to rotate the first hub assembly upon rotation thereof; and
- a first motor assembly having a first motor actuator connected and rotatable by a first hydraulic motor;

a second hydraulic drive assembly positioned apart from the first drive assembly along a common axis with the first hydraulic drive assembly, the second hydraulic drive assembly having:
- a second rotor assembly having a second hub assembly, a second drive shaft connected to the second hub assembly, and a second rotor actuator assembly with second rotor actuator connected to the second drive shaft to rotate the second hub assembly upon rotation thereof; and
- a second motor assembly having a second motor actuator connected and rotatable by a second hydraulic motor; and an engagement assembly positioning the first motor actuator to engage and disengage with the first rotor actuator in a housing of the first rotor assembly and the second motor actuator to engage and disengage with the second rotor actuator in a housing of the second rotor assembly.

21. The hydraulic drive system of claim 20, wherein the first rotor actuator includes a plurality of motor actuator teeth disposed on an end thereof.

22. The hydraulic drive system of claim 21, wherein the first rotor actuator includes a plurality of rotor actuator teeth disposed on an end thereof and correspond with the plurality of motor actuator teeth.

23. The hydraulic drive system of claim 20, wherein the first hydraulic motor operates a planetary gear drive connected to the first motor actuator.

24. The hydraulic drive system of claim 23, wherein the first motor actuator is positioned on an opposite side of the planetary gear drive with respect to the first hydraulic motor.

25. The hydraulic drive system of claim 24, wherein the housing is a includes a first bell housing defining a first bell housing receiving space and having a first bell housing flange along a first end thereof.

26. The hydraulic drive system of claim 25, wherein the engagement assembly extends through the first bell housing.

27. The hydraulic drive system of claim 26, wherein the engagement assembly includes a main shaft and a first engagement shaft that turns with motion of the main shaft.

28. The hydraulic drive system of claim 27, wherein the engagement assembly includes a yoke fixed to the first engagement shaft and connects to the first motor actuator.

29. The hydraulic drive system of claim 28, wherein the main shaft moves the first motor actuator between the engagement position and the disengagement position.

30. The hydraulic drive system of claim 27, wherein the engagement assembly has a second engagement shaft that turns with motion of the main shaft.

31. The hydraulic drive system of claim 30, wherein motion of the main shaft moves the second motor actuator between an engagement position and a disengagement position.

32. A hydraulic drive system, comprising:
a first hydraulic drive assembly having:
- a first rotor assembly having:
  - a first bell housing with a first caster housing extending therefrom;
  - a first rotor connected to the first caster housing;
  - a first hub assembly connected to the first rotor and having a first hub housing;
  - a first drive shaft connected to the first hub assembly and extending through the first caster housing; and
  - a first rotor actuator assembly with a first rotor actuator connected to the first drive shaft to rotate the first hub assembly upon rotation thereof; and
- a first motor assembly having:
  - a first motor actuator connected and rotatable by a first hydraulic motor operating a planetary gear drive connected to the first motor actuator, the first motor actuator is positioned on an opposite side of the planetary gear drive with respect to the first hydraulic motor, the drive shaft connected to the first motor actuator to rotate the hub housing fixed to a rotor of the first rotor assembly;

a second hydraulic drive assembly positioned apart from the first drive assembly along a common axis with the first hydraulic drive assembly, the second hydraulic drive assembly having:
- a second rotor assembly having:
  - a second hub assembly, a second drive shaft connected to the second hub assembly, and a second rotor actuator assembly with a second rotor actuator connected to the second drive shaft to rotate the second hub assembly upon rotation thereof; and
- a second motor assembly having a second motor actuator connected and rotatable by a second hydraulic motor; and an engagement assembly extending through the first bell housing and positioning the first motor actuator to engage and disengage with the first rotor assembly and the second motor actuator to engage and disengage with the second rotor assembly.

33. The hydraulic drive system of claim 32, wherein the engagement assembly includes a main shaft and a first engagement shaft that turns with motion of the main shaft.

34. The hydraulic drive system of claim 33, wherein the engagement assembly includes a yoke fixed to the first engagement shaft and connects to the first motor actuator.

35. The hydraulic drive system of claim 34, wherein the main shaft moves the first motor actuator between the engagement position and the disengagement position.

36. The hydraulic drive system of claim 32, wherein the engagement assembly has a second engagement shaft that turns with motion of the main shaft.

37. The hydraulic drive system of claim 36, wherein motion of the main shaft moves the second motor actuator between an engagement position and a disengagement position.

* * * * *